(12) United States Patent
Tanaka et al.

(10) Patent No.: US 7,702,612 B2
(45) Date of Patent: Apr. 20, 2010

(54) PRINT DATA EDITING APPARATUS AND PRINT DATA EDITING PROGRAM STORED IN A COMPUTER READABLE MEDIUM

(75) Inventors: Motonori Tanaka, Nagoya (JP); Chitoshi Ito, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1129 days.

(21) Appl. No.: 11/333,301

(22) Filed: Jan. 18, 2006

(65) Prior Publication Data

US 2006/0190423 A1    Aug. 24, 2006

(30) Foreign Application Priority Data

Jan. 31, 2005  (JP)  ............... 2005-022395

(51) Int. Cl.
G06F 17/30    (2006.01)
(52) U.S. Cl. ............... 707/1; 715/239; 715/274
(58) Field of Classification Search ............ 715/274, 715/239; 707/1
See application file for complete search history.

(56) References Cited

U.S. PATENT DOCUMENTS

| | | | | |
|---|---|---|---|---|
| 5,995,985 A | * | 11/1999 | Cai | ............... 715/201 |
| 6,112,209 A | * | 8/2000 | Gusack | ............... 707/101 |
| 6,393,425 B1 | * | 5/2002 | Kelly | ............... 707/100 |
| 6,418,428 B1 | | 7/2002 | Bosch et al. | |
| 6,842,262 B1 | * | 1/2005 | Gillihan et al. | ............... 358/1.15 |
| 7,003,723 B1 | * | 2/2006 | Kremer et al. | ............... 715/234 |
| 2001/0001555 A1 | * | 5/2001 | Bricklin et al. | ............... 345/302 |
| 2003/0149934 A1 | * | 8/2003 | Worden | ............... 715/513 |
| 2003/0191776 A1 | * | 10/2003 | Obrador | ............... 707/104.1 |
| 2004/0098671 A1 | * | 5/2004 | Graham et al. | ............... 715/527 |
| 2004/0162833 A1 | * | 8/2004 | Jones et al. | ............... 707/100 |
| 2004/0194015 A1 | * | 9/2004 | Hays et al. | ............... 715/501.1 |
| 2005/0116953 A1 | * | 6/2005 | Liongosari et al. | ............... 345/440 |

FOREIGN PATENT DOCUMENTS

| | | |
|---|---|---|
| EP | 0 965 932 A2 | 12/1999 |
| EP | 1 447 754 A1 | 8/2004 |
| JP | A 10-198742 | 7/1998 |
| JP | 2002-287964 | 10/2002 |

\* cited by examiner

*Primary Examiner*—Stephen S Hong
*Assistant Examiner*—Marshon Robinson
(74) *Attorney, Agent, or Firm*—Oliff & Berridge, PLC

(57) ABSTRACT

The relationship between an object and a database item, such as a title item, family name item, address item, city name item, and birth day item are displayed with a link line which connects the object with a database item such that the relationship can be readily observed. The display color of each displayed link line is normally the same color as the background color of a connected database item or the object. Because a link relationship between an object and a database item is displayed with a display color and a link line, the linking of the image to be printed print image with the database can be readily observed.

32 Claims, 21 Drawing Sheets

FIG. 3

| EmployeeID | LastName | FirstName | Title | TitleofCourtesy | Birth Date | Hire Date | Address | City | ... |
|---|---|---|---|---|---|---|---|---|---|
| 1 | Davolio | Nancy | Sales Representative | Ms. | 1948/12/8 | 1992/05/01 | 507-20th Ave. E. | Seattle | ... |
| 2 | Fuller | Andrew | Vice President Sales | Dr. | 1952/02/19 | 1992/08/14 | 908 W.Capital Wey. | Tacoma | ... |
| 3 | Leverling | Janet | Sales Representative | Ms. | 1963/8/30 | 1992/04/01 | 772 Moss Bay Blvd. | Kirkland | ... |
| 4 | Peacock | Margaret | Sales Representative | Mrs. | 1937/09/19 | 1993/05/03 | 4110 Old Redmond Rd. | Redmond | ... |
| 5 | Buchanan | Steven | Sales Manager | Mr. | 1955/03/04 | 1993/10/17 | 14 Garrett Hill | London | ... |

641 642 643 644 645 646 647 648 649

64

PRINT DATA EDITING APPARATUS AND PRINT DATA EDITING PROGRAM STORED IN A COMPUTER READABLE MEDIUM

This application claims priority from JP 2005-022395, filed Jan. 31, 2005, the disclosure of which is incorporated herein in its entirety by reference thereto.

BACKGROUND

The disclosure relates to a print data editing apparatus and print data editing program stored in a computer-readable medium Generally, to dispose and print data read out from database in a specified layout, such as a label for printing, the layout is edited by displaying a print image on a display unit. When editing such a layout, the position where the print object data, called the object, is disposed and data of which item of the database should be inserted into the object of the layout, i.e., linkage, is determined. At that time, if the quantity of objects increases, which database item is linked to which object becomes complicated, so that its linkage often becomes difficult to see. For the reason, Japanese Patent application Laid-Open No. 10-198742 has disclosed an identity indication for identifying a linkage between a cell (cell field) within a displayed accounting form and a specified cell (table-cell) in the database.

SUMMARY

However, according to the above-described link method, a linkage is discriminated so that the cell field and a table-cell correspond one to one. This method does not allow printing with insertion of a type in which the read-in data changes each time when a record is changed over with database field (item) allocated to an object.

The disclosure is to solve the above-described problem. One object is to provide a print data editing apparatus capable of indicating the relationship between a field in a database and a print object clearly and a print data editing program that is stored in a computer-readable medium To achieve the above-described object, according to a first aspect, there is provided a print data editing apparatus for creating and editing print data to be printed on a print unit, comprising a display that displays inputted data composed of characters, graphics, images, tables or drawing data as an object which is a print object to be printed on the print unit; a work area provided in the display for editing the object; a database storage device that stores a database as an assembly of a plurality of the inputted data having information of each item; a database display area provided in the display that displays at least items of the database; a linking element that links an item of the database displayed in the database display area with the object displayed in the work area; and a link display controller that controls displaying a link relationship between the database item and the object linked by the linking element on the display so that the linkage is capable of being recognized.

According to a second aspect, there is provided a print data editing program, for making a computer execute creation and editing of print data to be printed on a print unit, comprising an object display step of displaying inputted data composed of characters, graphics, images, tables or drawing data as an object on a work area provided on a display, that is a print object to be printed by the print unit; a database display step of displaying an item of a database that is an assembly of a plurality of the inputted data having information of each of at least one item, stored in a database storage device, in at least a database display area provided on the display; a link step of linking an item of database displayed in the database display area with the object displayed in the work area; and a link display control step controlling display of a linking relationship between the database item and the object linked in the link step on the display so that of the link relationship is capable of being recognized.

BRIEF DESCRIPTION OF THE DRAWINGS

The disclosure will be made with reference to the drawings, in which:

FIG. 3 is a schematic diagram showing a memory area of an employee database;

DETAILED DESCRIPTION OF EMBODIMENTS

Hereinafter exemplary embodiments will be described with reference to the accompanying drawings. The print data editing apparatus will be described using a personal computer 2 connected to a print unit 1 as an example. The personal computer 2 is loaded with a print data editing program. First, the print unit 1 and the personal computer 2 will be described with reference to FIGS. 1 and 2.

Figure 1:
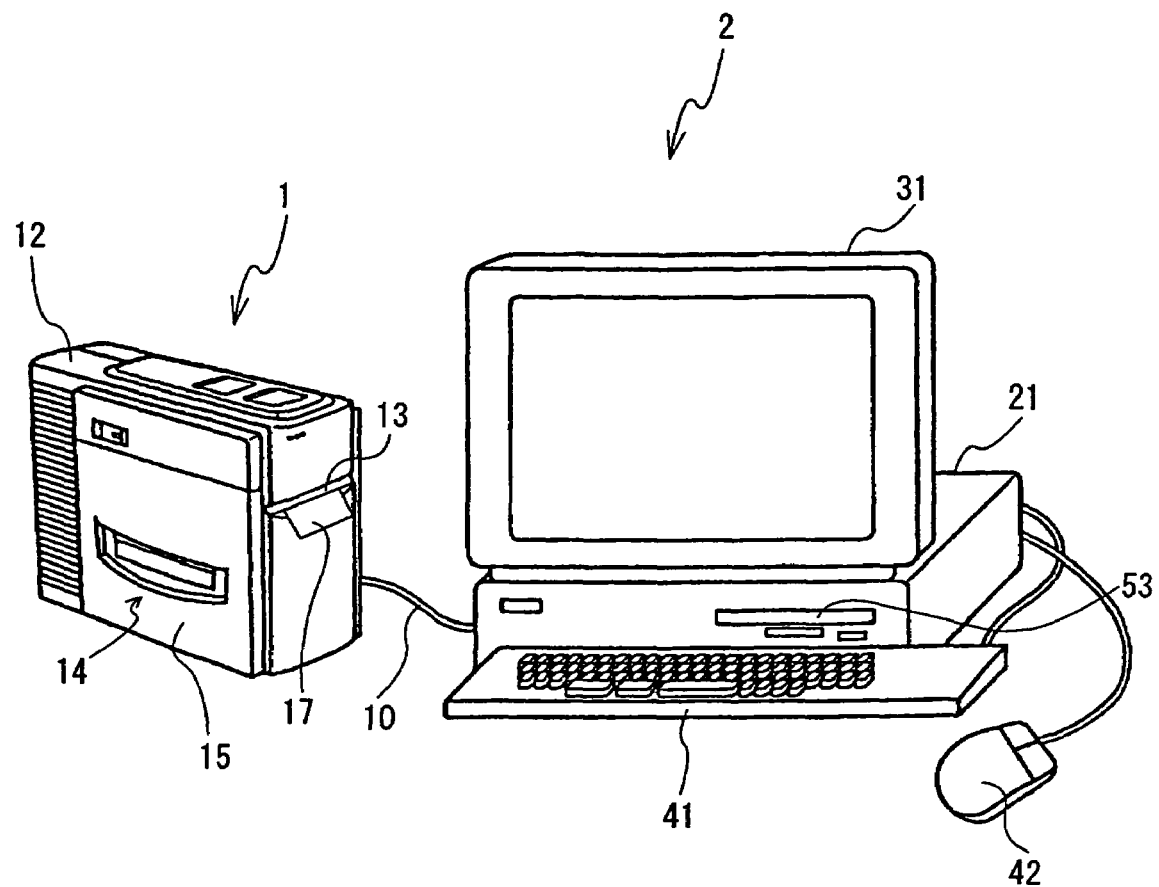
FIG. 1 is a perspective view showing an appearance of a print unit and a personal computer.

As shown in FIG. 1, the personal computer 2 and the print unit 1 are connected through a USB cable 10 based on, for example, USB standard and data exchange is carried out through the USB cable 10. The personal computer 2 is a well known personal computer, comprising a main body 21 containing a CPU 50 and the like (see FIG. 2), a monitor 31, a keyboard 41, and a mouse 42 as shown in FIG. 1. The monitor 31, the keyboard 41, and the mouse 42 are respectively connected to the main body 21 through connection cables. The personal computer 2 creates print data based on image data created with software in which the disclosed print data editing program is installed and sends the created print data to the print unit 1.

As shown in FIG. 1, the print unit 1 is covered with a substantially rectangular solid casing 12. A discharge port 13 for discharging a tape 17 is provided on the front face (forward face on the right side of FIG. 1) of the casing 12. A tape cassette storage portion 14 is provided inside the left side face of the casing 12 and a tape cassette can be mounted detachably by opening a cover 15 provided on the left side face of the casing 12. The tape cassette storage portion 14 is provided with a print mechanism for printing a tape 17 by running the tape 17 between a thermal head, having a plurality of heat generating devices, and a platen roller which makes contact with the thermal head. The tape 17 of the mounted tape cassette is printed by the print mechanism, cut by a tape cutter of the print mechanism and discharged from the discharge port 13.

Figure 2:
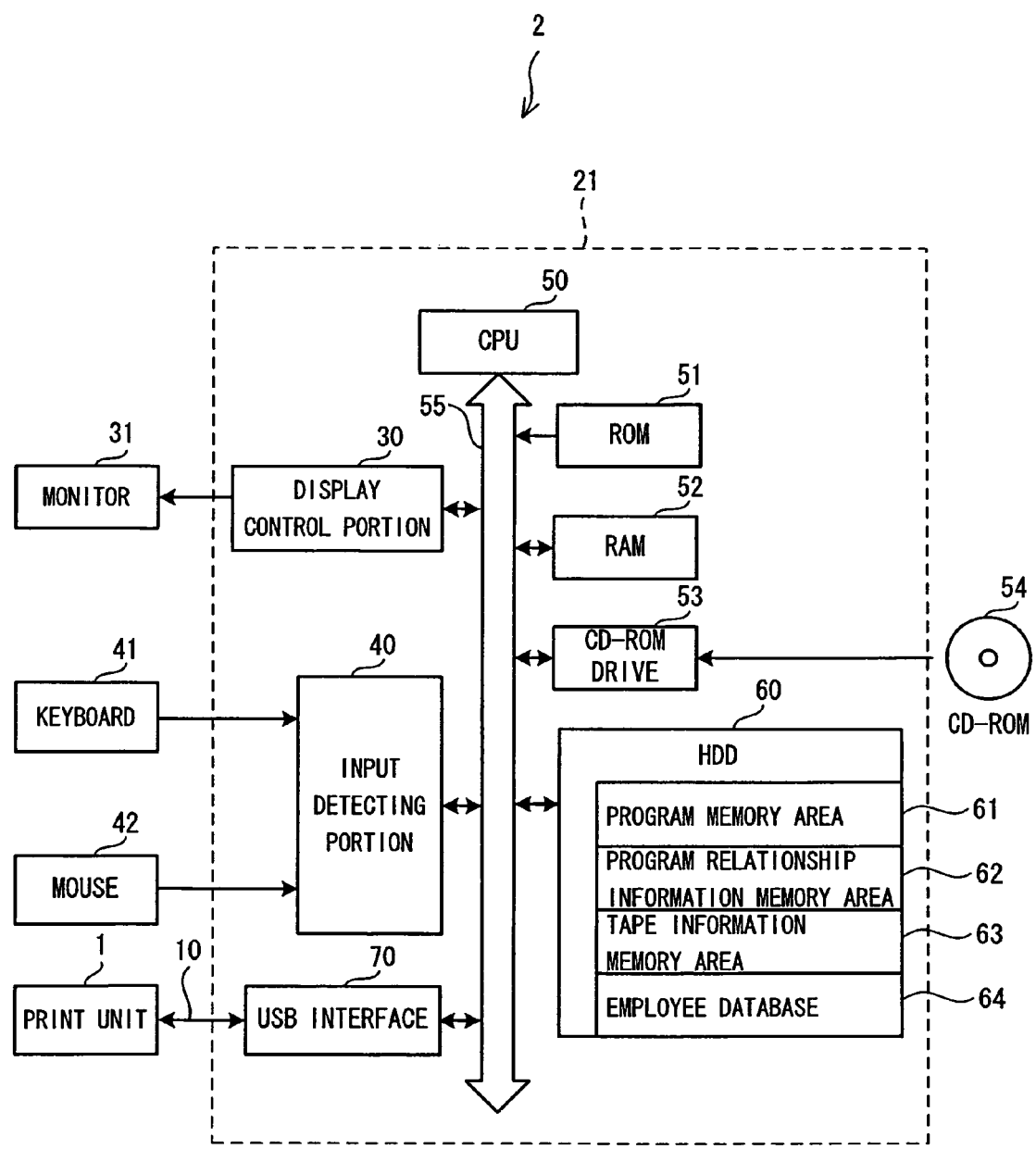
FIG. 2 is a block diagram showing an electronic structure of the personal computer.

Next, the electronic structure of the personal computer 2 will be described with reference to FIG. 2. As shown in FIG. 2, the personal computer 2 is provided with a CPU 50 for controlling the personal computer 2. The CPU 50 contains a ROM 51 that stores programs, such as BIOS, which the CPU 50 is to execute, a RAM 52 that temporarily stores data and a CD-ROM drive 53 that uses a CD-ROM 54 as a data memory medium These components are connected through a bus 55. In addition to the CD-ROM drive 53 for reading data from the CD-ROM 54, a HDD 60, used as a data memory unit, is connected to the CPU 50 by the bus 55. The HDD 60 includes a program memory area 61 which stores a variety of programs to be executed by the personal computer 2, such as a print data editing program; a program relationship information memory area 62 which stores information, such as setting and initial values necessary for execution of the program and data; a tape information memory area 63 which stores information concerning a tape for use in the print unit 1, and a database 64 which is an assembly of input data and the like. Here, an employee database is presumed as the database 64.

Further, a USB interface 70 for communicating with external devices including the print unit 1, a display control portion 30 for executing a screen display processing for a monitor 31 which displays an operation screen to a user, and an input detecting portion 40, which is connected to the keyboard 41 and the mouse 42 which the user operates for detecting an input through the keyboard 41 and the mouse 42, are connected to the CPU 50 through the bus 55. The personal computer 2 also may be provided with a flexible disk drive (not shown), a voice input/output portion and various other interfaces.

The CD-ROM 54 stores software containing the print data editing program, settings and data for use in executing the program and the like. Upon introduction, the information from the CD-ROM 54 is stored into the program memory area 61 and the program relationship information memory area 62 provided on the HDD 60. Meanwhile, a method for acquiring the print data editing program, its use data and the like of the personal computer 2 is not restricted to obtaining via the CR-ROM 54, but other memory medium, such as a flexible disk, a magnetic optical (MO) disk, may be used and it is permissible to acquire from another terminal on a network by connecting the personal computer 2 to the network.

The employee database 64 stored by the HDD 60 of the personal computer 2 will now be described. As shown in FIG. 3, the employee database 64 is structured so to be capable of storing an ID item 641, a family name item 642, a first name item 643, a position item 644, a title item 645, a birth day item 646, a hire date item 647, an address item 648, a city name item 649 and other items, with information about an employee as a single record.

Next, the editor 100, which is started by the personal computer 2, will be described with reference to FIGS. 4 and 5. The editor 100 is displayed on the monitor 31 of the personal computer 2 and carries out data entry and instructions by user operation of the keyboard 41 or the mouse 42.

Figure 4:
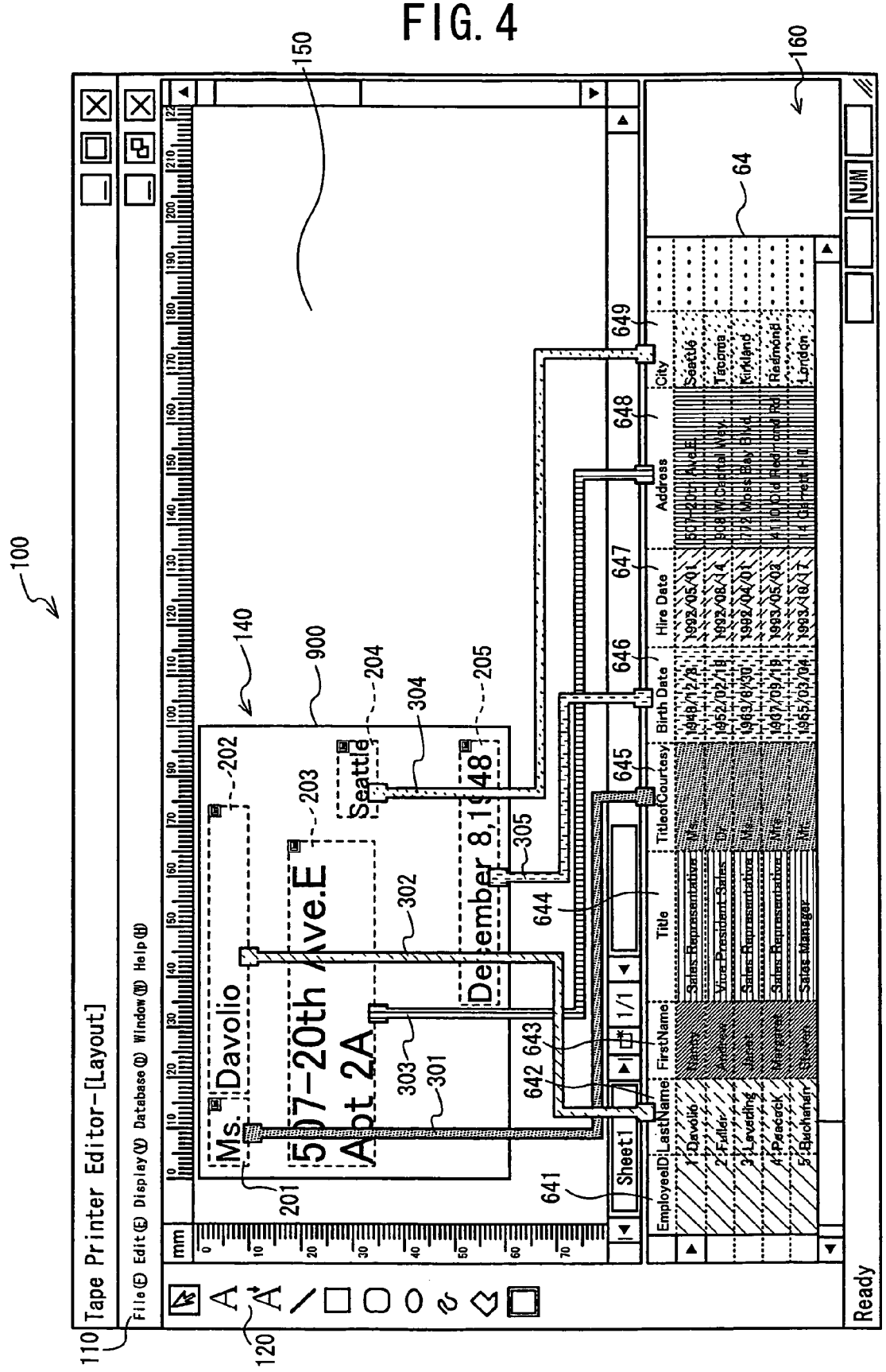
FIG. 4 is an image chart of an editor for inputting characters and the like to be printed by the print unit.

As shown in FIG. 4, a menu bar 110 for operation instruction is provided on the top of the editor 100 and a tool bar 120 is provided on the left side. A work area 150 for editing characters or the like to be printed with the print unit 1 is provided on an upper half of the editor 100. In the work area 15, a print image 140, in which a print object is disposed based on a layout, is displayed. A paper frame 900 indicating the frame of a paper is displayed in the print image 140 and five character objects 201, 202, 203, 204, 205 are disposed within the paper frame 900.

A database display area 160, indicating the memory content of the employee database 64 currently connected or used, is provided in the lower half of the editor 100. In the example of FIG. 4, the employee database 64 shown in FIG. 3 is connected and linking data is displayed in the database display area 160. A particular display color is set for each item (field) of the employee database 64 so as to enable items to be recognized at a glance.

Print data can be created in an object created within the work area 150 by inserting field data by linking with a field of the database being used according to a selection by an operator. Here, a character object 201 is linked to a title item 645 and the content of the title item 645 of a selected record is reflected in the character object 201 and displayed therein. The character object 202 is linked to a family name item 642 and the content of the family name item 642 of a selected record is reflected in the character object 202 and displayed therein. The character object 203 is linked to an address item 648 and the content of the address item 648 of a selected record is reflected in the character object 203 and displayed therein. Further, the character object 204 is linked to a city name item 649 and the content of the city name item 649 of a selected record is reflected in the character object 204 and displayed therein. Lastly, the character object 205 is linked to a birth day item 646 and the content of the birth day item 646 of a selected record is reflected in the character object 205 and displayed therein.

The relationships between the above-described character objects 201, 202, 203, 204, 205 and the title item 645, the family name item 642, the address item 648, the city name item 649, and the birth day item 646 are displayed with link lines 301, 302, 303, 304, 305 which connect each object with each item so that they can be recognized at a glance. That is, the character object 201 and the title item 645 are connected with the link line 301, the character object 202 and the family name item 642 are connected with the link line 302, the character object 203 and the address item 648 are connected with the link line 303, the character object 204 and the city name item 649 are connected with the link line 304, and the character object 205 and the birth day item 646 are connected with the link line 305. The displayed color of each link line is the same as the background color of a connected item. Because a linkage relationship between the object and item is indicated with the display color and the link line, the linkage between the print image and database can be grasped at a glance. Although the display color of the link line is set to be the same color as the background color of the item, it is permissible to set a particular display color which can be discriminated for the frame line of an object and set the background color and the display color of the link line to the same color as the display color of the frame line, thereby further integrating the display colors so as to facilitate understanding of the linkages.

Figure 5:
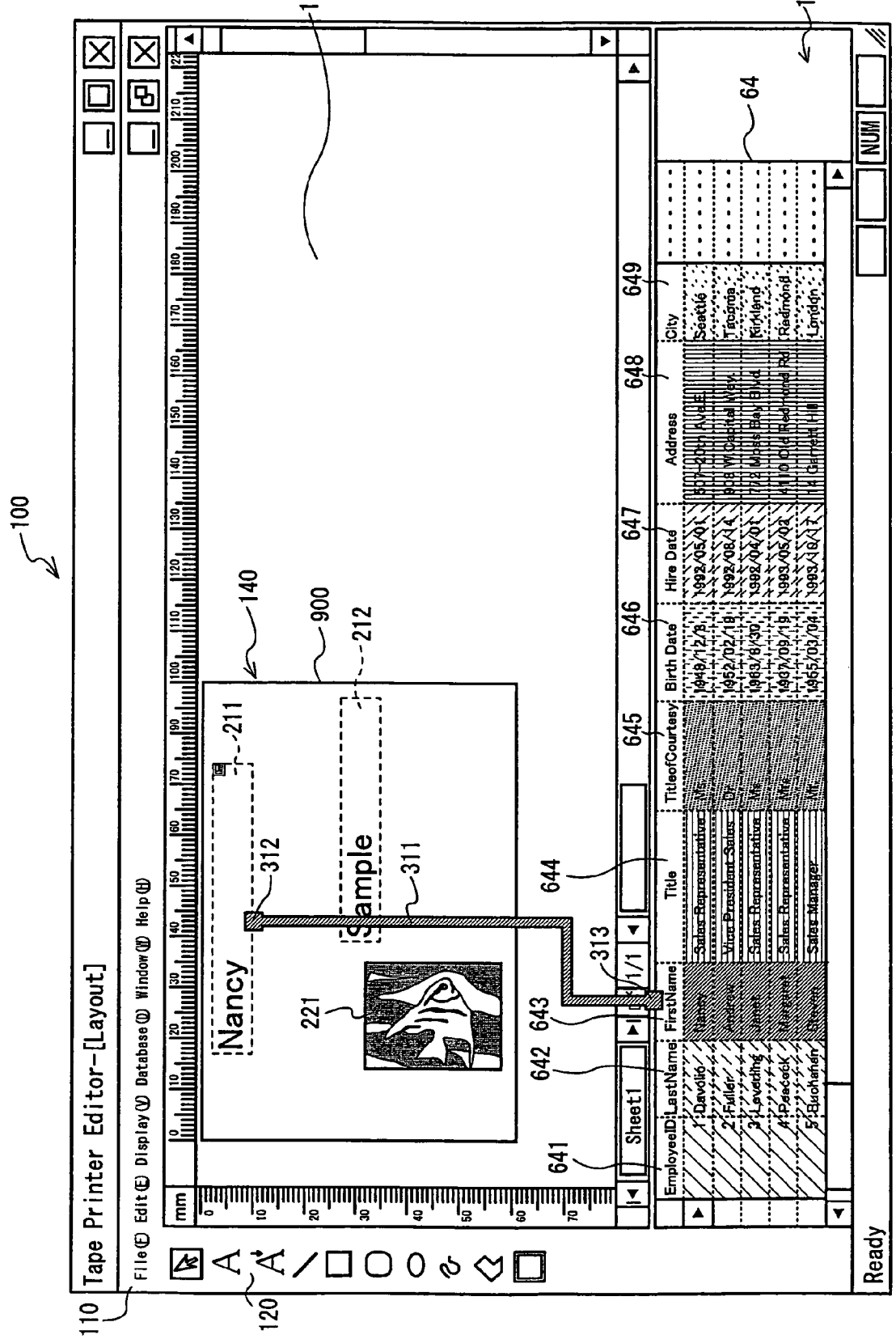
FIG. 5 is an image chart of the editor for inputting characters and the like to be printed by the print unit.

FIG. 5 shows an example where a different object is created within the work area 150 in the editor 100. In this example, character objects 211, 212 and an image object 221 are created. The character object 211 is linked with the first name item 643 of the database 64 so that the content of the first name item 643 in a selected record, "Nancy" is reflected and displayed. The character object 212 is kept as it was created and not linked. The image object 221 concerns an image data of a fish and is not linked either. The character object 211 and the first name item 643 are connected by a link line 311 and the display color of the link line 311 is the same as the background color of the first name item 643.

Next, print data editing processing, which is to be executed with the personal computer 2 having the above-described structure, will be described with reference to FIGS. 6 to 21. First, the complete flow of the print data editing processing of this embodiment will be described with reference to FIG. 6. When the print data editing program is started, respective initialization processings are executed (S1). The editor 100 is displayed on the monitor 31. Next, whether a mouse cursor 401 (see FIG. 16) is located on an object in the work area 150 is determined (S2). If the mouse cursor 401 is located on any object (S2: YES), tool tip display processing for displaying the field name of a field (item) in a database displayed in the database display area 160 linked to that object is executed (S3). The detail of the tool tip display processing will be described later with reference to FIG. 7.

If the mouse cursor 401 is not located on the object (S2: NO) or after the tool tip display processing (S3) is ended, the processing proceeds to S4, in which key input by means of the keyboard 41 or selection using the mouse 42 is accepted (S4). Alternatively, such could be done using a touch screen. Whether an accepted key input is the addition of an object by the pressing of the button or the like on the tool bar on the editor 100 is determined (S5). If it is an addition of the object (S5: YES), an instructed object is created in the work area 150 (S7). Then, the procedure returns to S2, in which the position of the mouse cursor 401 is checked again.

Unless it is an addition of the object (S5: NO), an object in the work area 150 is selected and whether linking that object with any field (item) in a database displayed within the database display area 160 is instructed is determined (S9). Relating the object with the field can be executed according to a method of, with an object selected, then selecting a field desired to be linked with or another method. If linking the object with the field is instructed (S9: YES), linking processing of linking the selected object with the field is executed (S11). A link line is drawn between the selected object and field following the linking processing (S37) and the procedure returns to S2, in which the position of the mouse cursor 401 is judged again. The detail of the linking processing will be described below with reference to FIG. 8 and the detail of the link line drawing processing will be described below with reference to FIG. 14.

Unless linking the object with the field is instructed (S9: NO), whether any field (item) in a database displayed within the database display area 160 is dragged is determined (S13). Because, according to this embodiment, by dragging the field and dropping it into the object, linking of the field and the object can be carried out, if a drag operation is executed (S13: YES), drag linking processing of accepting a drop operation and executing the linking processing is executed (S15) and a link line is drawn from a dragged field to a drag destination object following that linking (S37). The procedure then returns to S2, in which the position of the mouse cursor 401 is judged again. The detail of the drag linking processing will be described below with reference to FIG. 9 and the detail of the link line drawing processing will be described below with reference to FIG. 14.

Unless the drag operation is carried out (S13: NO), whether additional menu for the link line was selected is determined (S17). The additional menu for the link line may be so constructed to be selectable by, for example, specifying any point within the work area 150 with the mouse 42 so as to display a right-click menu. If the additional menu for the link line is selected (S17: YES), a condition not linked with any object or any database field, namely, an independent link line that is not connected is added to the work area 150 (S19, see FIG. 19) and its link line is drawn (S37). Then, the procedure again returns to S2, in which the position of the mouse cursor 401 is determined. The detail of the link line drawing processing will be described below with reference to FIG. 14.

Unless the additional menu for the link line is selected (S17: NO), whether changing a connection destination by dragging an already displayed link line is instructed is determined (S21). If changing of the link line is instructed (S21: YES), the linking is changed following a move instruction for the end portion of the link line linked with an object or a field. Then, link line changing processing for reflecting field data after the change on the object is executed (S23) and the link line after the change is drawn (S37). The procedure returns to S2, in which the position of the mouse cursor 401 is determined again. The detail of the link line changing processing will be described below with reference to FIG. 10 and the detail of the link line drawing processing will be described below with reference to FIG. 14.

Unless changing of the link line is instructed (S21: NO), whether changing of the line type of a specified link line being displayed was instructed is determined (S25). Instruction on changing of the link line type can be, for example, selected by specifying any link line within the work area 150 with the mouse 42 so as to display the right click menu. According to this embodiment, some types of the link lines can be displayed depending on an operator's desire. If changing of the line type of the link line is instructed (S25: YES), the link line is changed to a line type following the instruction (S27) and the link line after the change is drawn (S37). The procedure returns to S2, in which the position of the mouse cursor 401 is determined again. The detail of the line type changing processing will be described below with reference to FIG. 11 and the detail of the link line drawing processing will be described below with reference to FIG. 14.

Unless the changing of the line type is instructed (S25: NO), whether changing of the background color of a database field is instructed is determined (S29). According to this embodiment, as well as an existing background color, the background color of a database field can be set depending on an operator's desire. If changing of the background color of the field is instructed (S29: YES), the background color of the field is changed to a background color following the instruction (S31) and if a link line is connected from that field, the link line having a display color corresponding to the background color after the change is drawn (S37). The procedure returns to S2, in which the position of the mouse cursor 401 is determined again. The detail of the background color changing processing will be described below with reference to FIG. 12 and the detail of the link line drawing processing will be described below with reference to FIG. 14.

Unless the changing of the background color is instructed (S29: NO), whether setting whether a selected link line should be displayed is instructed is determined (S33). Although according to this embodiment, linking of the object and field is indicated with the link line as specified originally, display of the link line is changeable according to an instruction of the operator because a print image may be difficult to see due to the indication of the linkage. If setting so that a selected link line is to be displayed is instructed (S33: YES), display setting processing is executed to receive and reflect the content of the instruction (S35) and, then, the link line drawing processing is carried out (S37). The procedure returns to S2, in which the position of the mouse cursor 401 is determined again. The detail of the display setting processing will be described below with reference to FIG. 13 and the detail of the link line drawing processing will be described below with reference to FIG. 14.

Unless setting so that the link line is to be displayed is instructed (S33: NO), whether erasing of the link line is instructed is determined (S39). If the erasing of the link line is instructed (S39: YES), an object connected to the link line instructed to be erased is processed and then the processing of erasing the link line is carried out (S40). The procedure returns to S2, in which the position of the mouse cursor 401 is determined again. The detail of the link line erase processing will be described below with reference to FIG. 13.

By repeating the above-described processing, linking of an object displayed within the work area 150 with database field displayed in the database display area 160 can be recognized and changed easily.

Figure 6:
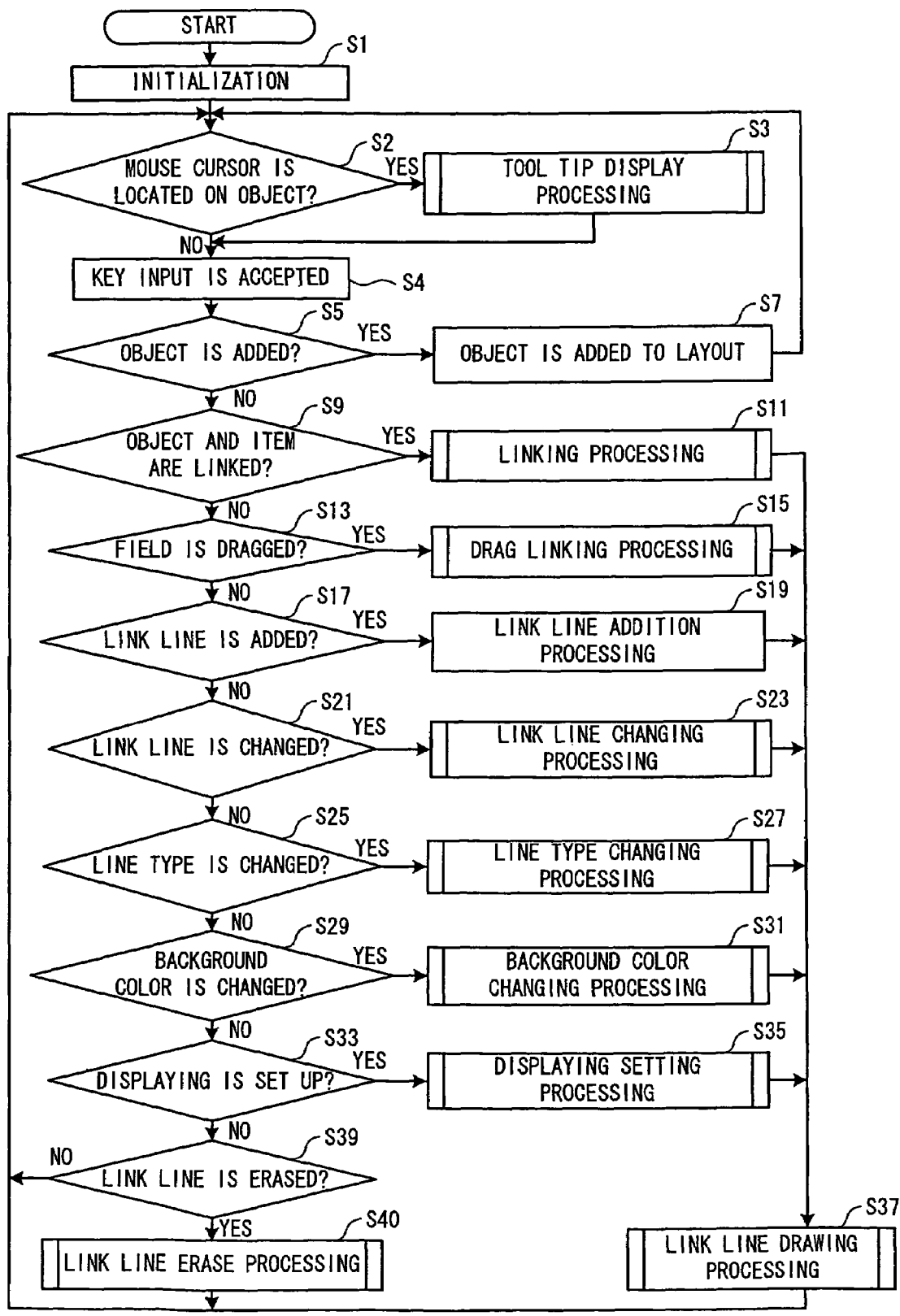
FIG. 6 is a flow chart of a main routine of print data editing processing.
Figure 7:
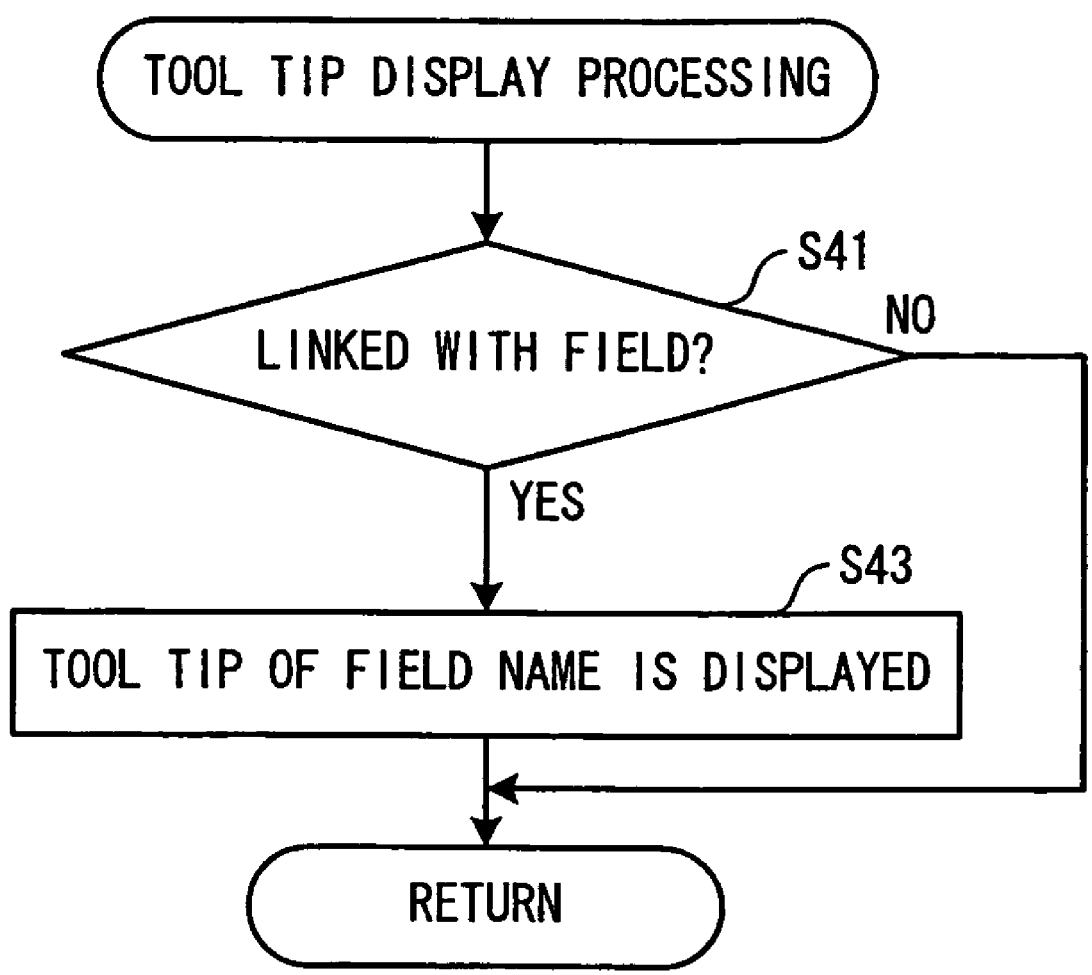
FIG. 7 is a flow chart of tool tip display processing to be executed in print data editing processing.
Figure 16:
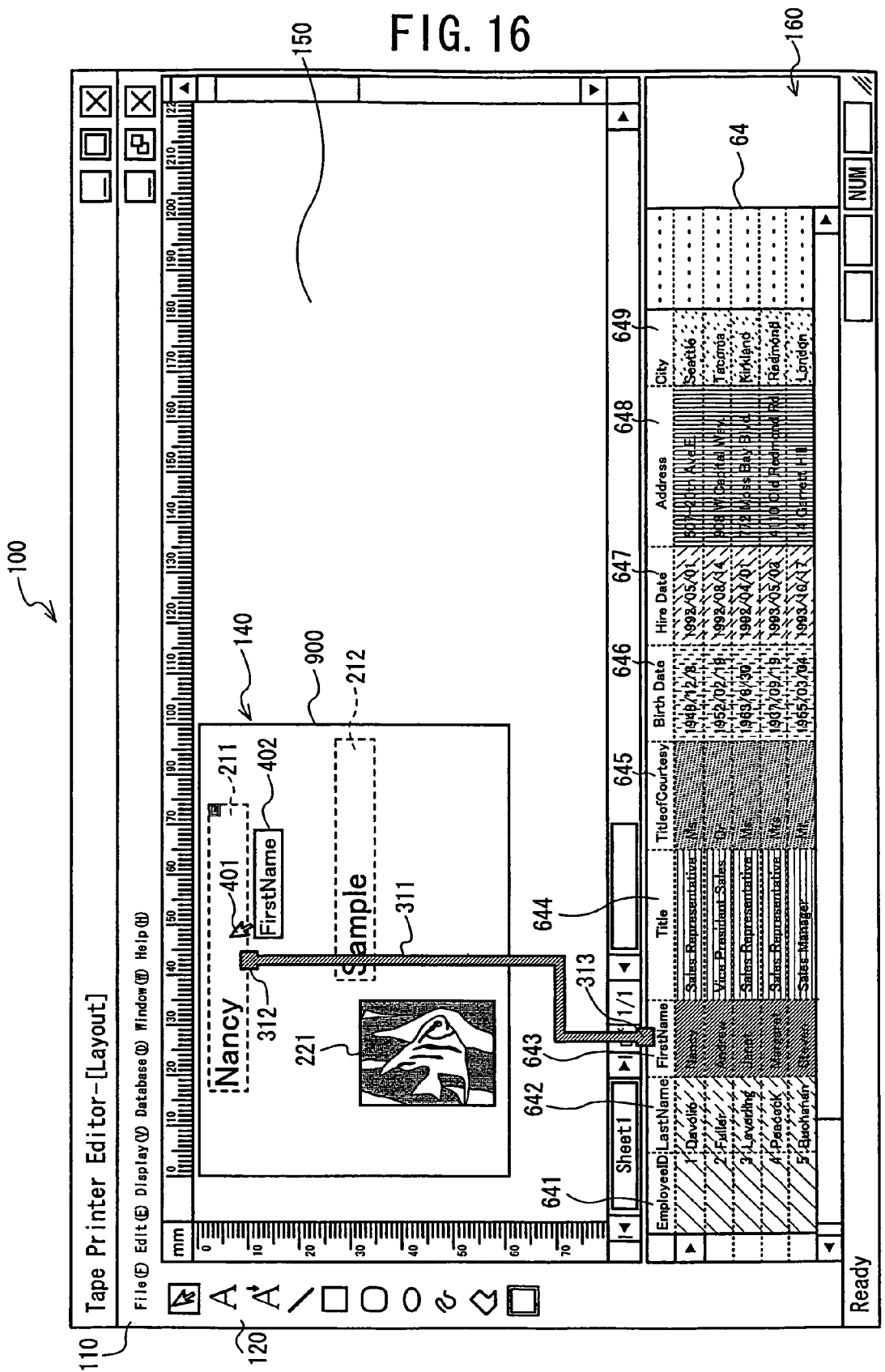
FIG. 16 is an image chart of the editor currently indicating a tool tip.

Next, the tool tip display processing executed in S3 of FIG. 6 will be described with reference to FIGS. 7 and 16. First, whether an object on which the mouse cursor 401 is placed is linked with a database field displayed within a connected database, namely, the database display area 160 is determined (S41). Otherwise (S41: NO), the tool tip display is not executed and the procedure returns to FIG. 6.

If an object on which the mouse cursor 401 is placed is linked with the field of a connected database (S41: YES), as shown in FIG. 16, the name of a linked field is displayed on the tool tip 402 in the vicinity of the mouse cursor 401 (S43). For example, in the example of FIG. 16, "First Name", which is a field name of the first name item 643 is displayed on the tool tip 402 because the text object 211 is linked with the first name item 643 of the employee database 64 displayed within the database display area 160. As a result of such a tool tip indication, the operator can grasp the link destination of an object to which he currently pays attention without instructing an operation by key input or moving his line of sight in order to confirm the link destination of the link line. After the tool tip display processing is ended through the above process, the procedure returns to FIG. 6.

Figure 8:
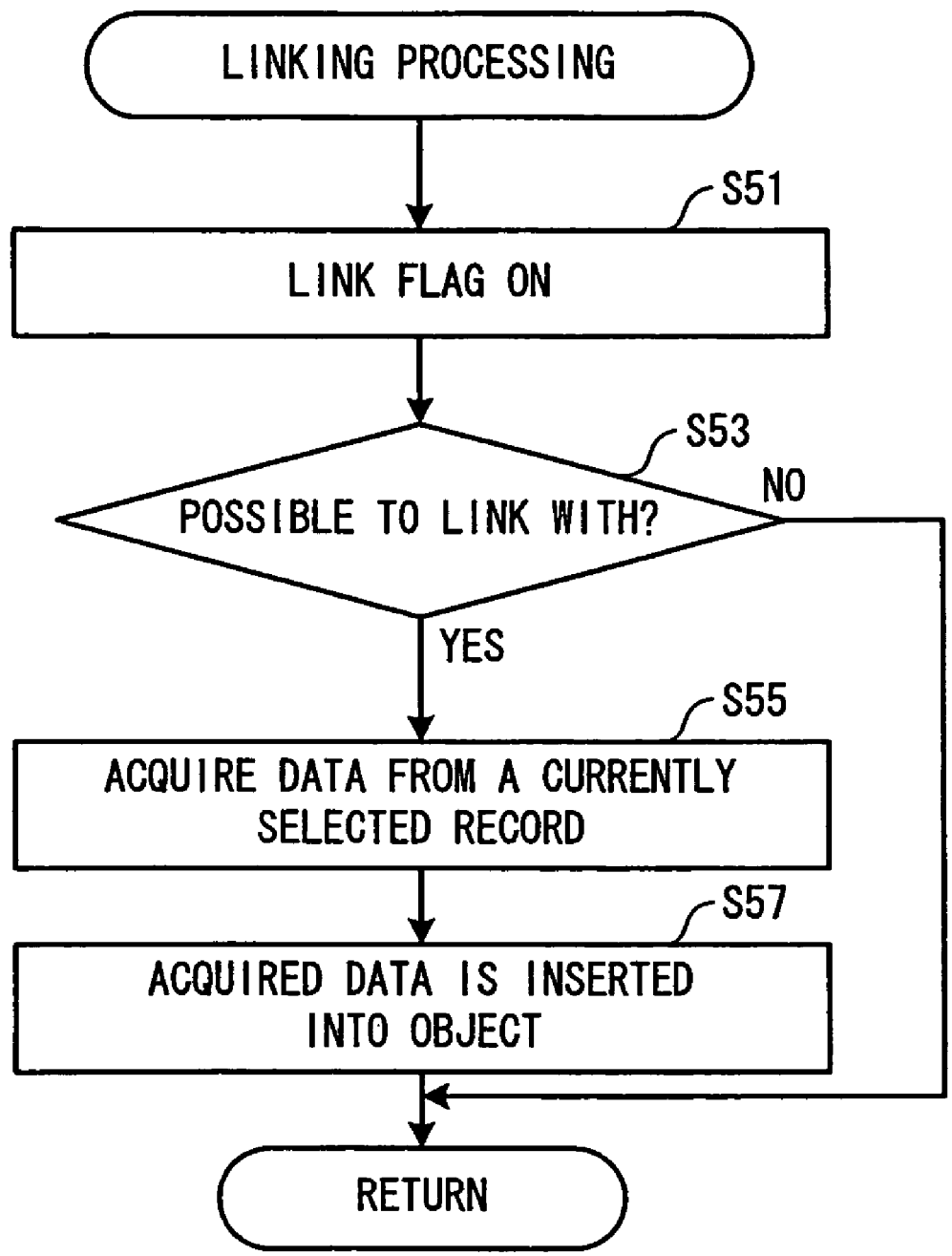
FIG. 8 is a flow chart of relationship processing to be executed in print data editing processing.
Figure 17:
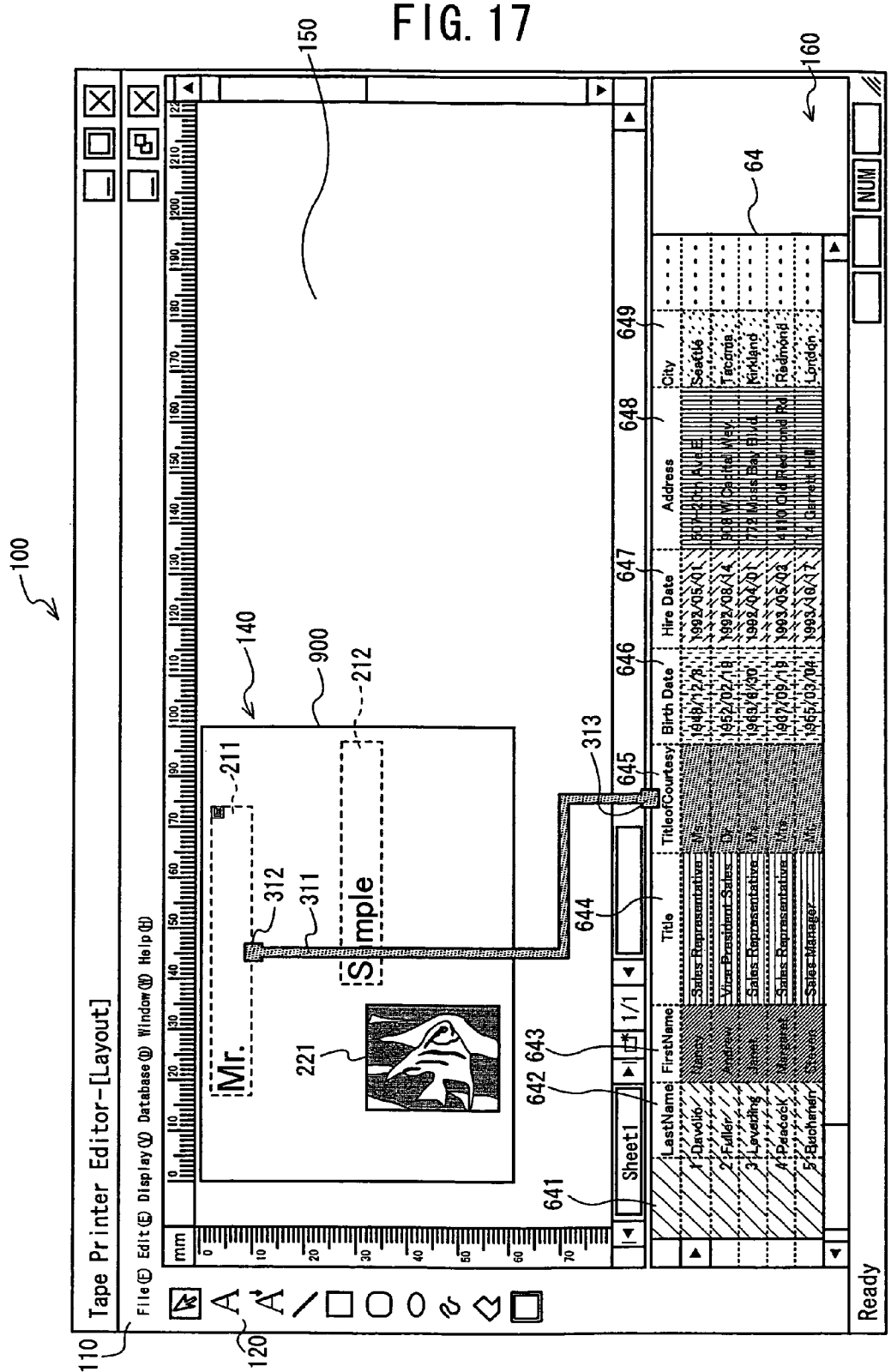
FIG. 17 is an image chart of the editor in the case where a linked field is changed.
Figure 21:
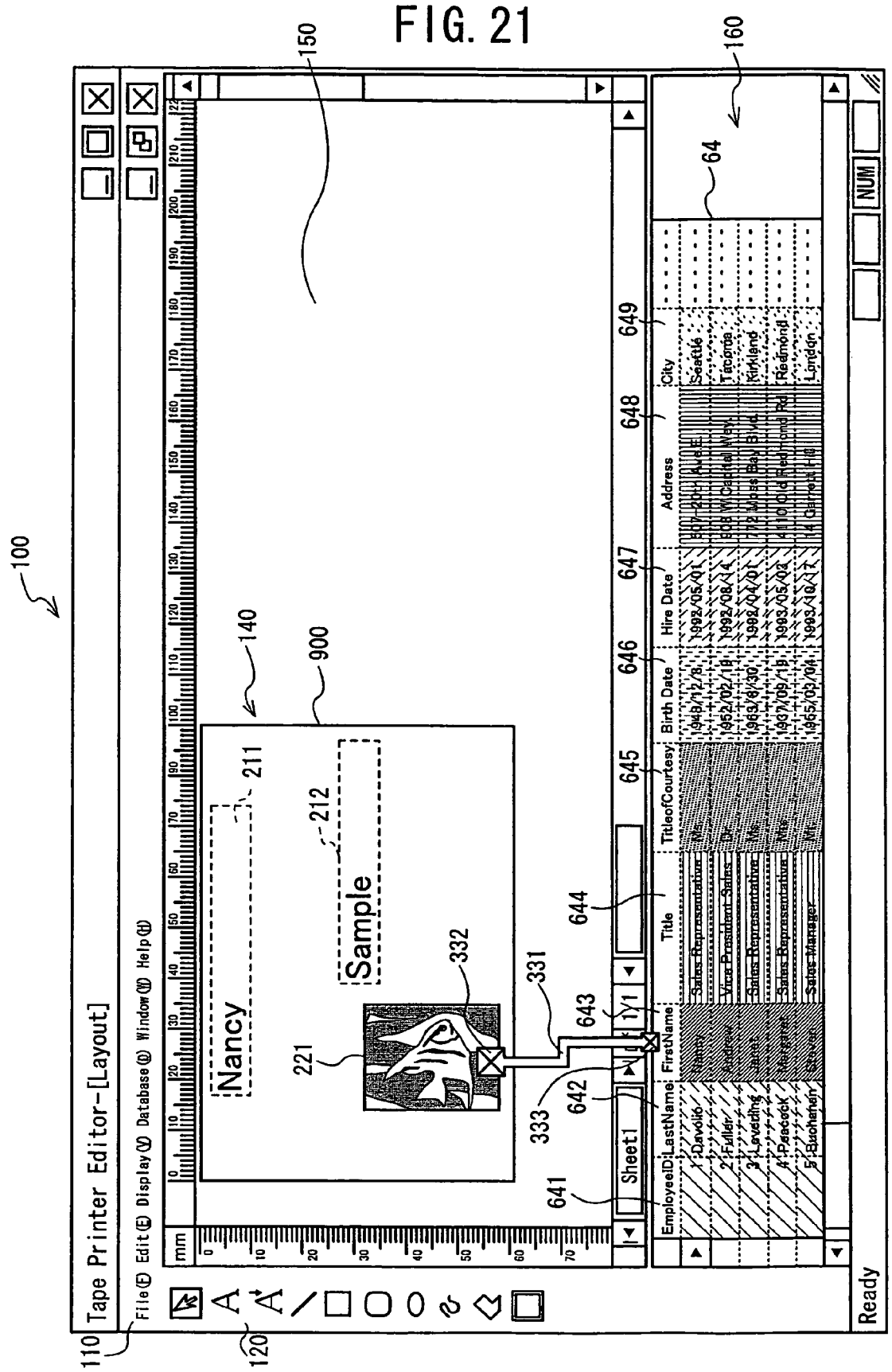
FIG. 21 is an image chart of the editor indicating a drawing condition of the link line in the case where the linkage between an object and a field impossible to link with each other is specified.

Next, the linking processing executed in S11 of FIG. 6 will be described with reference to FIGS. 8 and 17. First, a link flag indicating that a selected object is linked is set to ON and stored in the RAM 52 (S51). Then, whether the selected object has an attribute which can be linked with a field specified as a link destination is determined (S53). For example, if as shown in FIG. 17, objects displayed in the work area 150 are character objects 211, 212 and image object 221 while data of all fields of the employee database 64 displayed within the database display area 160 are of only text, the image object 221 cannot be linked with any field of the connected database. The reason is that the attribute of the object is different from that of the field. S53 is a step of determining a case where linking is impossible because the attributes are different. If the linking is impossible (S53: NO), the procedure returns to a main routine of FIG. 6. If the link is specified when the linking is impossible, the link line is drawn as shown in FIG. 21 by link drawing processing (see FIG. 14) described below.

If the attributes of the object and field agree with each other and the linking is possible (S53: YES), data of the field to be linked is obtained from a currently selected record of the employee database 64 displayed within the database display area 160 (S55). The obtained data is inserted into the selected object (S57) and the procedure returns to the main routine of FIG. 6. A print image is displayed in a condition in which data of the field linked by this processing is inserted into the specified object within the work area 150.

Figure 9:
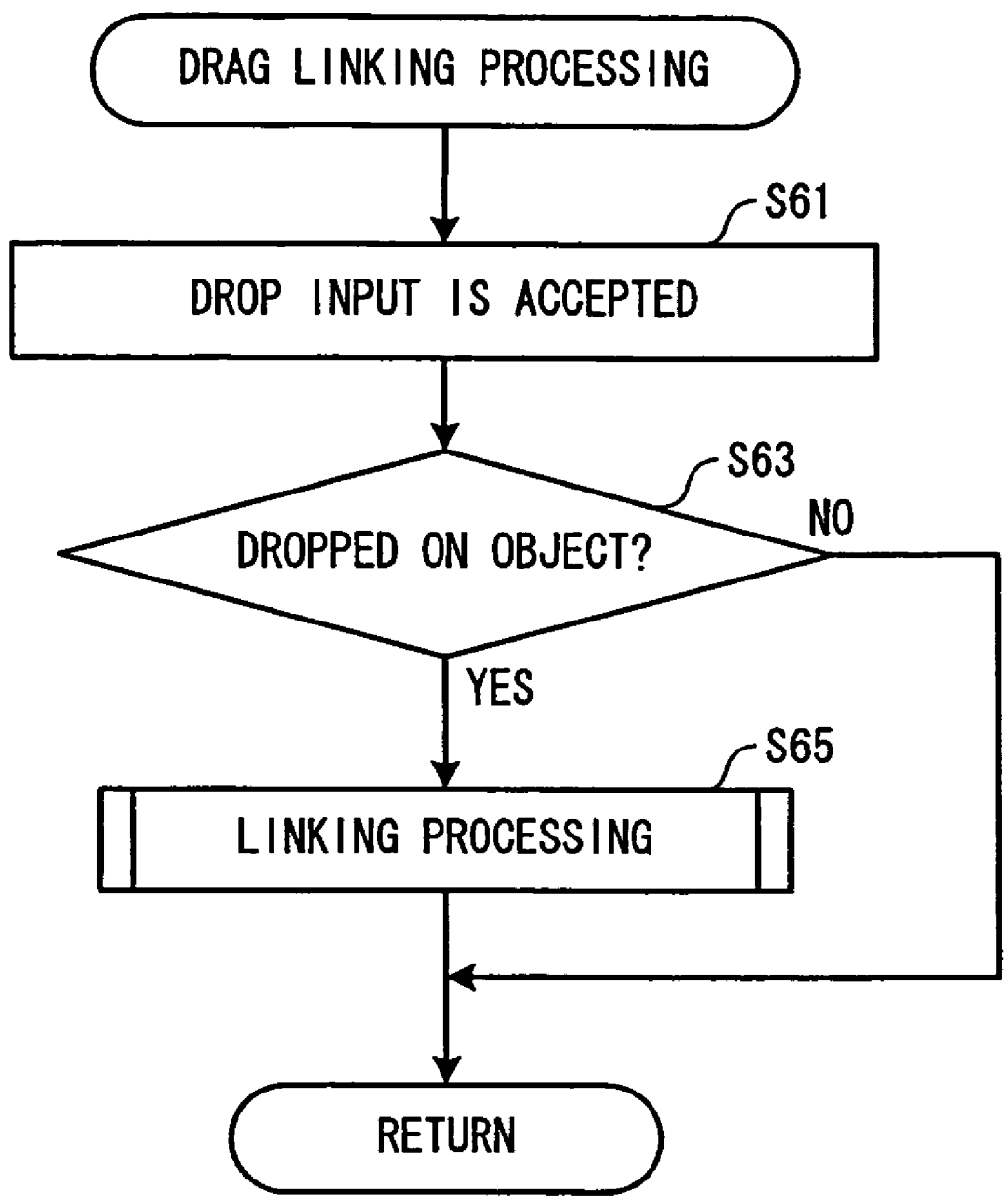
FIG. 9 is a flow chart of drag linking processing to be executed in print data editing processing.
Figure 10:
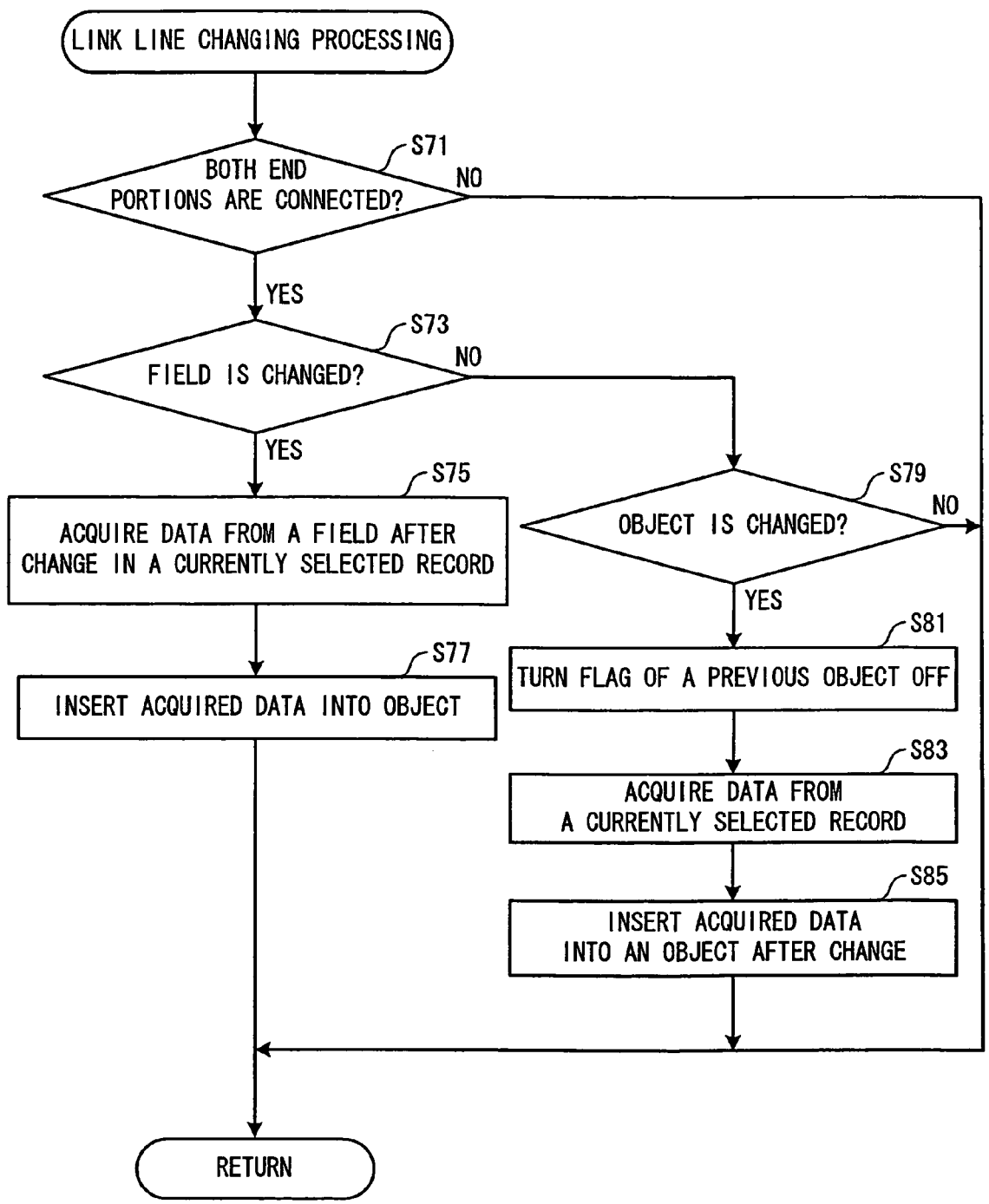
FIG. 10 is a flow chart of link line change processing to be executed in print data editing processing.
Figure 18:
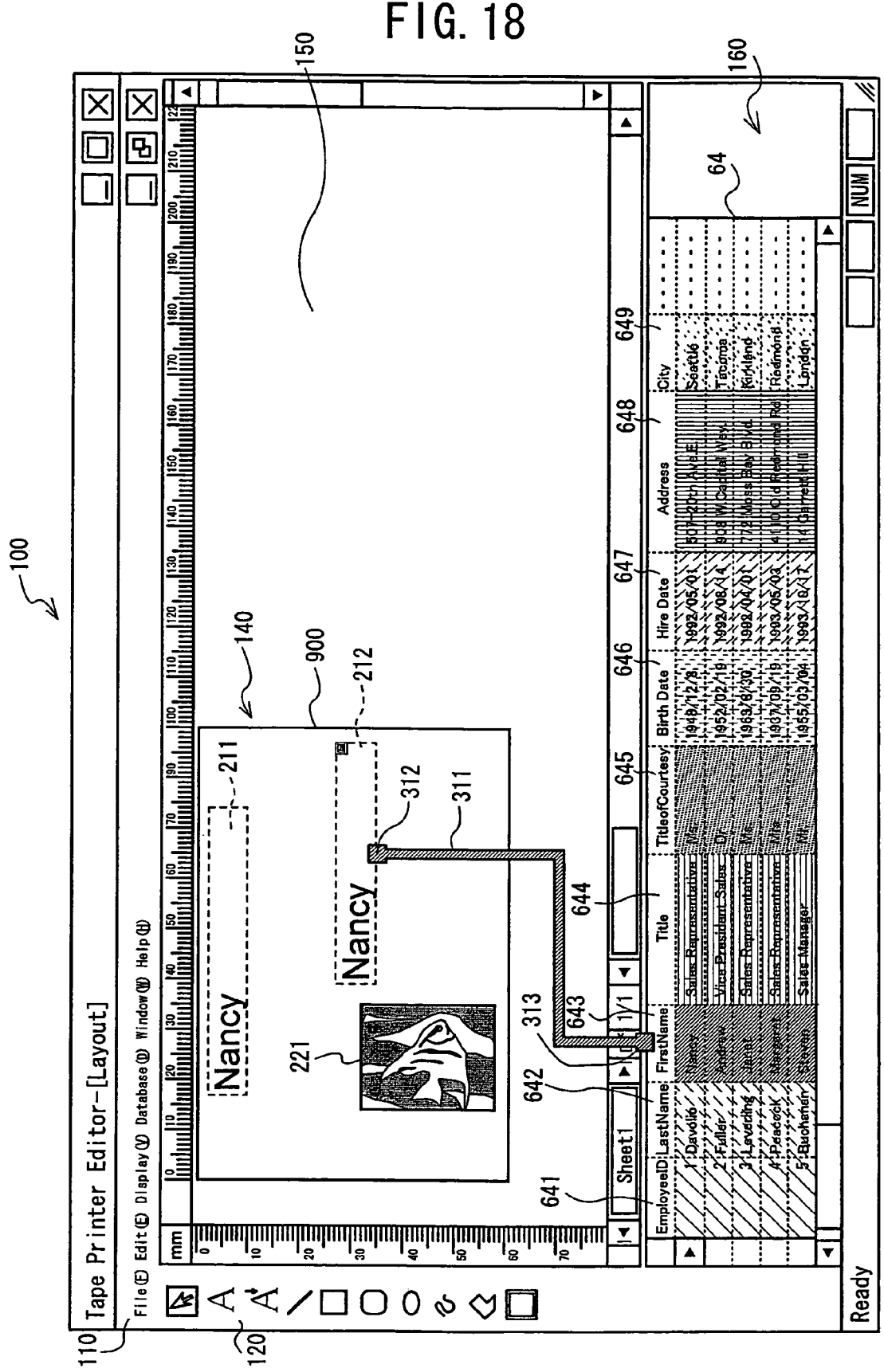
FIG. 18 is an image chart of the editor in the case where a linked object is changed.

Next, the drag linking processing executed in S15 of FIG. 6 will be described with reference to FIGS. 9, 17, and 18. Because field dragging has already been accepted, an input at a drop destination is accepted (S61). Next, whether the drop destination is an object within the work area 150 is determined (S63). Unless the drop is made on the object (S63: NO), the procedure returns to the main routine of FIG. 6 because the linking cannot be performed by the drag-and-drop operation.

If the drop is made on the object (S63: YES), the procedure proceeds to a subroutine of the linking processing of FIG. 8 (S65). After the linking processing is ended, the procedure returns to the main routine of FIG. 6.

Next, the link line changing processing executed in S23 of FIG. 6 will be described with reference to FIGS. 10, 5, 17, and 18. First, whether both end portions of the link line which is an object to be dragged are connected to an object and the database is determined (S71). If any one of them is not connected (S71: NO), the procedure returns to the main routine of FIG. 6.

If the end portions are respectively connected to the object and the database (S71: YES), which end portion of a currently selected link line is to be changed is checked successively. For example, a case of changing the link line based on linking condition between the object and the field of the database shown in FIG. 5 will be considered. FIG. 5 shows a condition in which the character object 211 and the first name item 643 are connected with the link line 311. First, whether the field is changed is determined (S73). If the field is changed, for example, an end portion 313 of the link line 311 of FIG. 5 is dragged from the first name item 643 to the title item 645, the result is shown in FIG. 17. If the field has been changed from the first name item 643 to the title item 645 (S73: YES), data in the changed field (the title item 645) is acquired (S75). Then, the acquired data of the title item 645 is inserted into a linked object (character object 211; an object located at the other end portion 312 of the selected link line 311) (S77) and the procedure returns to the main routine of FIG. 6. As a result of the processing, as shown in FIG. 17, a print image is displayed in a condition in which data of the title item 645, which is the field after the change, is inserted into the specified object within the work area 150. The procedure then returns to the main routine of FIG. 6, in which the link line drawing processing (FIG. 14) described below is executed, so that the color of the link line 311 becomes the same color as the background color of the title item 645.

Unless the field is changed (S73: NO), whether the object is changed is determined (S79). When changing the object, the end portion 312 of the link line 311 of FIG. 5 is dragged from the character object 211. For example, it is dropped to the character object 212 as shown in FIG. 18. Unless the object is changed (S79: NO), the procedure returns to the main routine of FIG. 6. If the object is changed (S79: YES), the link flag of an object before the change is set to OFF and stored in the RAM 52 (S81). Then, data of a currently selected record in the linked field is acquired (S83). The acquired data is inserted into the object after the change (object located at the other end portion of the currently selected link line) (S85) and the procedure returns to the main routine of FIG. 6. As a result of the processing, a print image is displayed in a condition in which the field data is inserted into the changed object within the work area 150. That is, as shown in FIG. 18, the character object 212 and the first name item 643 are linked and their link relationship is displayed with the link line 311. Although the linking with the character object 211 is released, the content of the data is left within the object. Then, "Nancy", which is the content of the first name item 643 of a currently selected record is inserted into the new character object 212.

Figure 11:
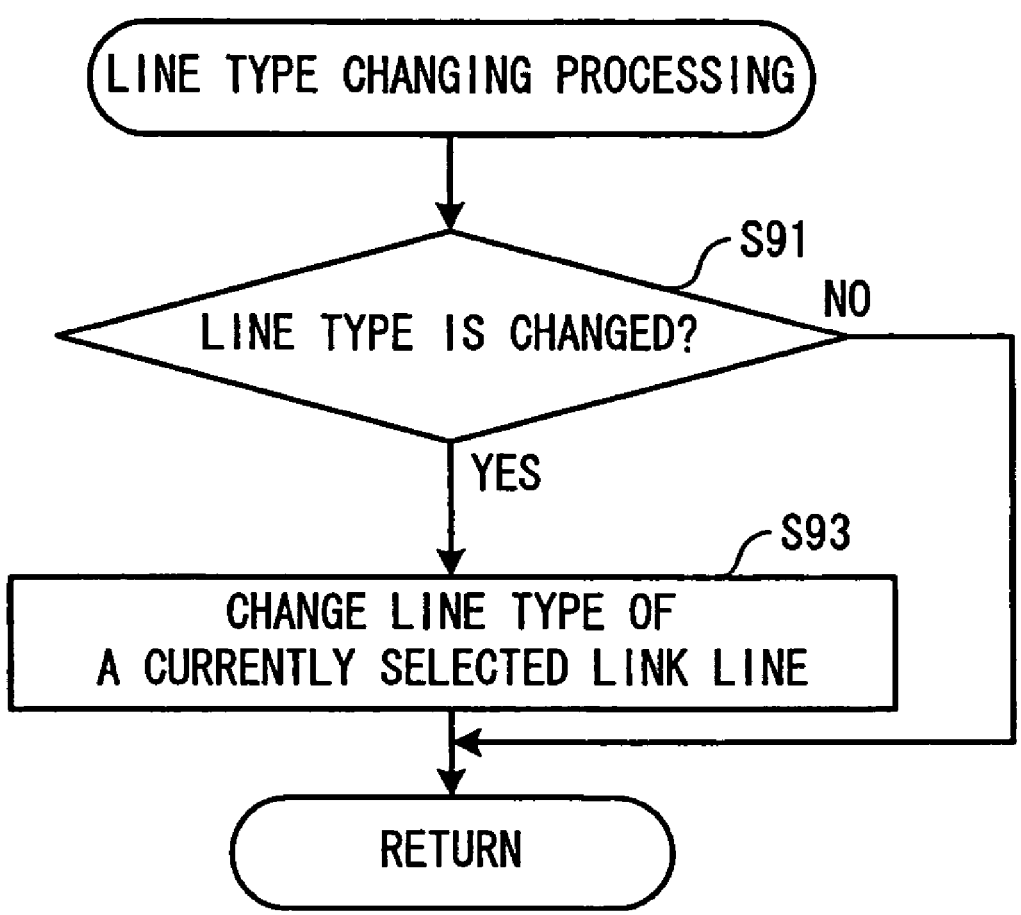
FIG. 11 is a flow chart of line type change processing to be executed in print data editing processing.

Next, the line type changing processing executed in S27 of FIG. 6 will be described with reference to FIG. 11. First, the link line has been already selected in the routine of FIG. 6, so that the line type selection menu is started. Then, whether the selected link line was changed from a currently displayed line type is determined (S91). Unless the line type was changed (S91: NO), the procedure returns to the main routine of FIG. 6. If the line type was changed (S91: YES), the line type of the currently selected link line is changed to a specified line type (S93) and the procedure returns to the main routine of FIG. 6.

Figure 12:
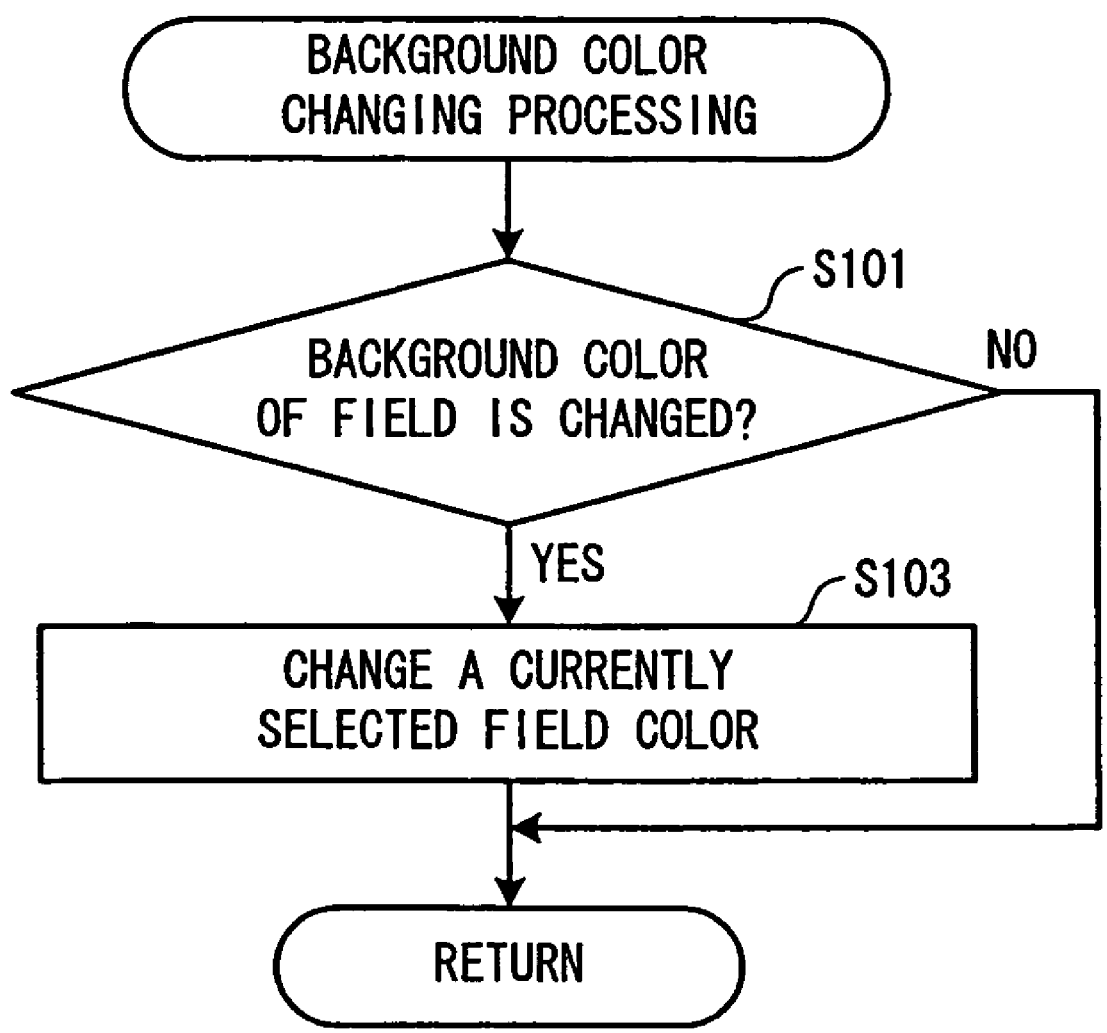
FIG. 12 is a flow chart of background color change processing to be executed in print data editing processing.

Next, the background color changing processing executed in S31 of FIG. 6 will be described with reference to FIG. 12. First because a particular field has already been selected in the routine of FIG. 6 so that the background color changing selection menu is entered, whether the background color of an actually selected field was changed is determined (S101). Unless the background color was changed (S101: NO), the procedure returns to the main routine of FIG. 6. If the background color was changed (S101: YES), the currently selected field is changed to the specified background color (S103) and, then, the procedure returns to the main routine of FIG. 6.

Figure 13:
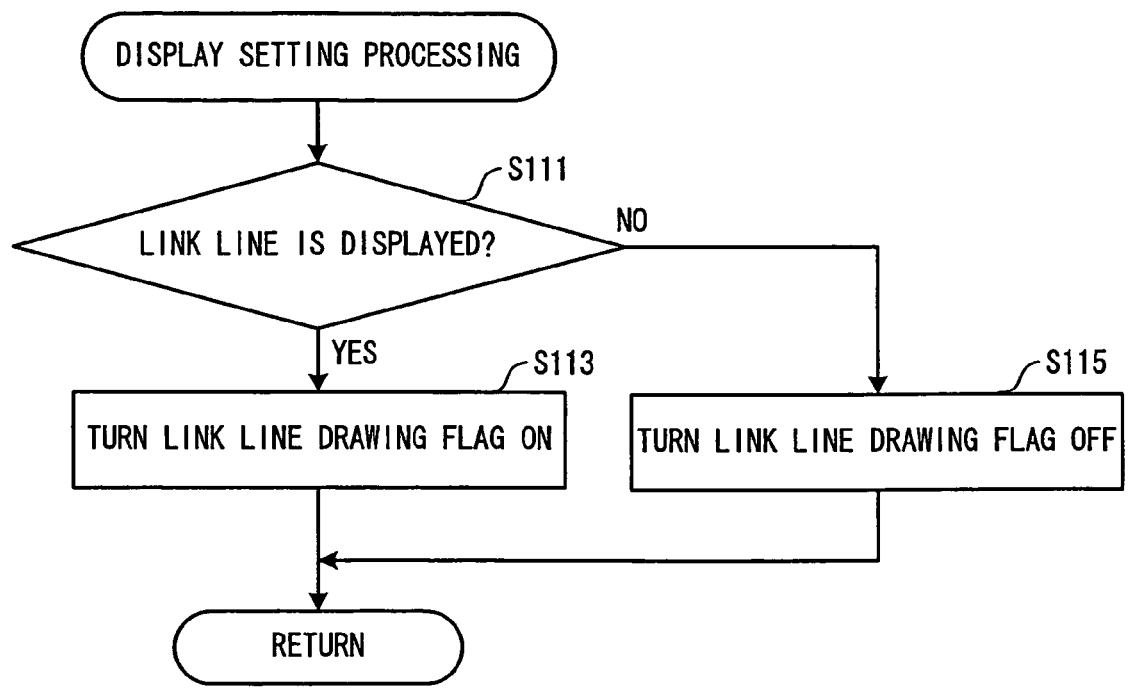
FIG. 13 is a flow chart of display setting processing to be executed in print data editing processing.
Figure 14:
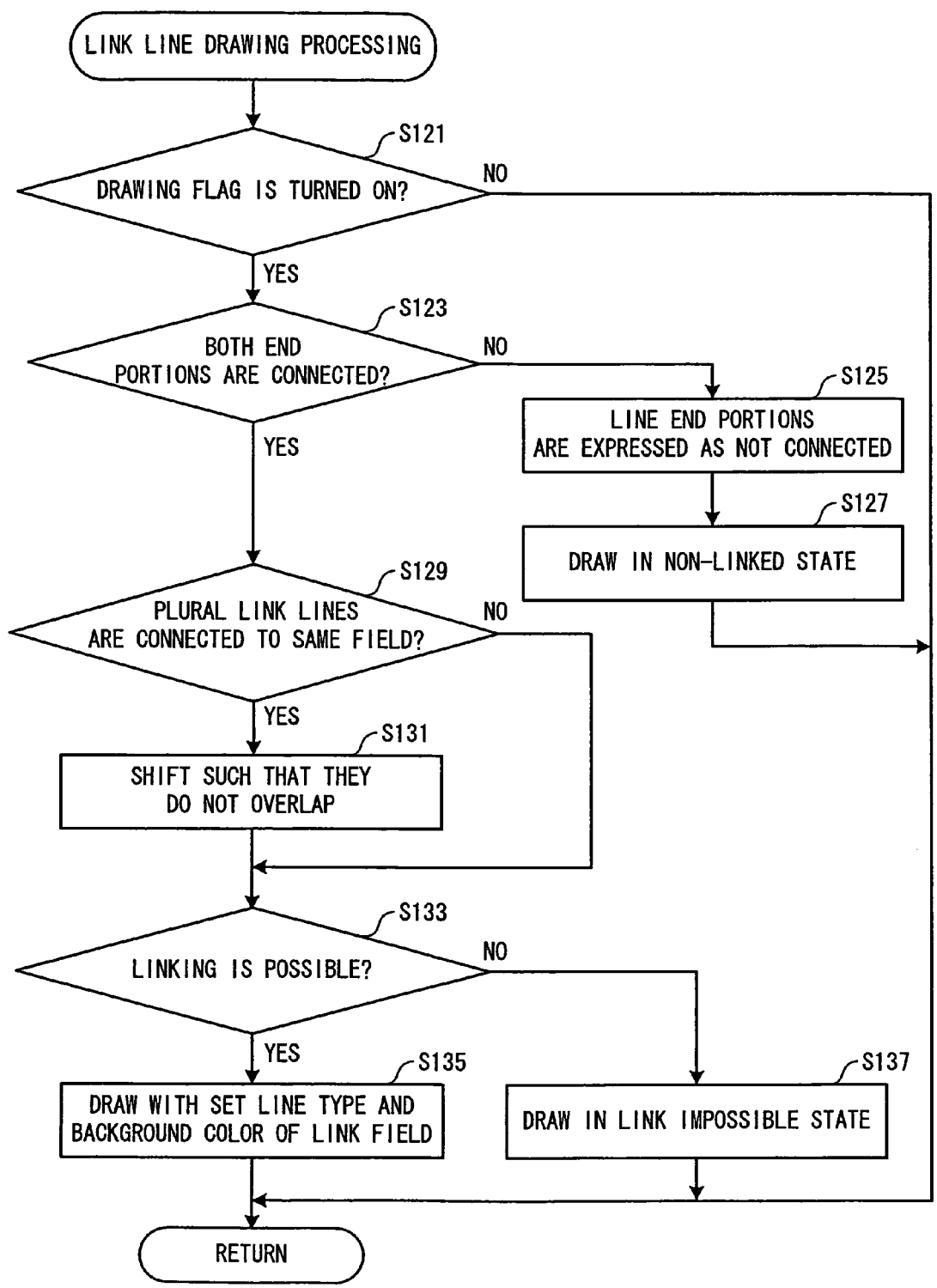
FIG. 14 is a flow chart of link line drawing processing to be executed in print data editing processing.

Next, the display setting processing executed in S35 of FIG. 6 will be described with reference to FIG. 13. First, because in the routine of FIG. 6 the link line has already been selected so that the display setting menu is entered, whether displaying of that link line is set is determined (S111). If displaying of the link line is set (S111: YES), the drawing flag of the link line is set to ON and stored in the RAM 52 (S113) and, then, the procedure returns to the main routine of FIG. 6. If no display of the link line is set (S111: NO), the drawing flag of that link line is set to OFF and stored in the RAM 52 (S115) and then the procedure returns to the main routine of FIG. 6. Although the processing is so structured that whether each of individual link lines to be drawn is set, it is permissible to so structure the processing that whether all link lines or no link lines are to be displayed is set collectively.

Next, the link line drawing processing to be executed in S37 of FIG. 6 will be described with reference to FIGS. 14, 19, 20, and 21. Because the link line drawing processing is started always with a link line or field selected, first, whether the drawing flag of a currently selected link line or a link line connected to a currently selected field is set to ON is determined (S121). If the drawing flag is set to OFF (S121: NO), the link line is set to no-display and the procedure returns to the main routine of FIG. 6.

Figure 19:
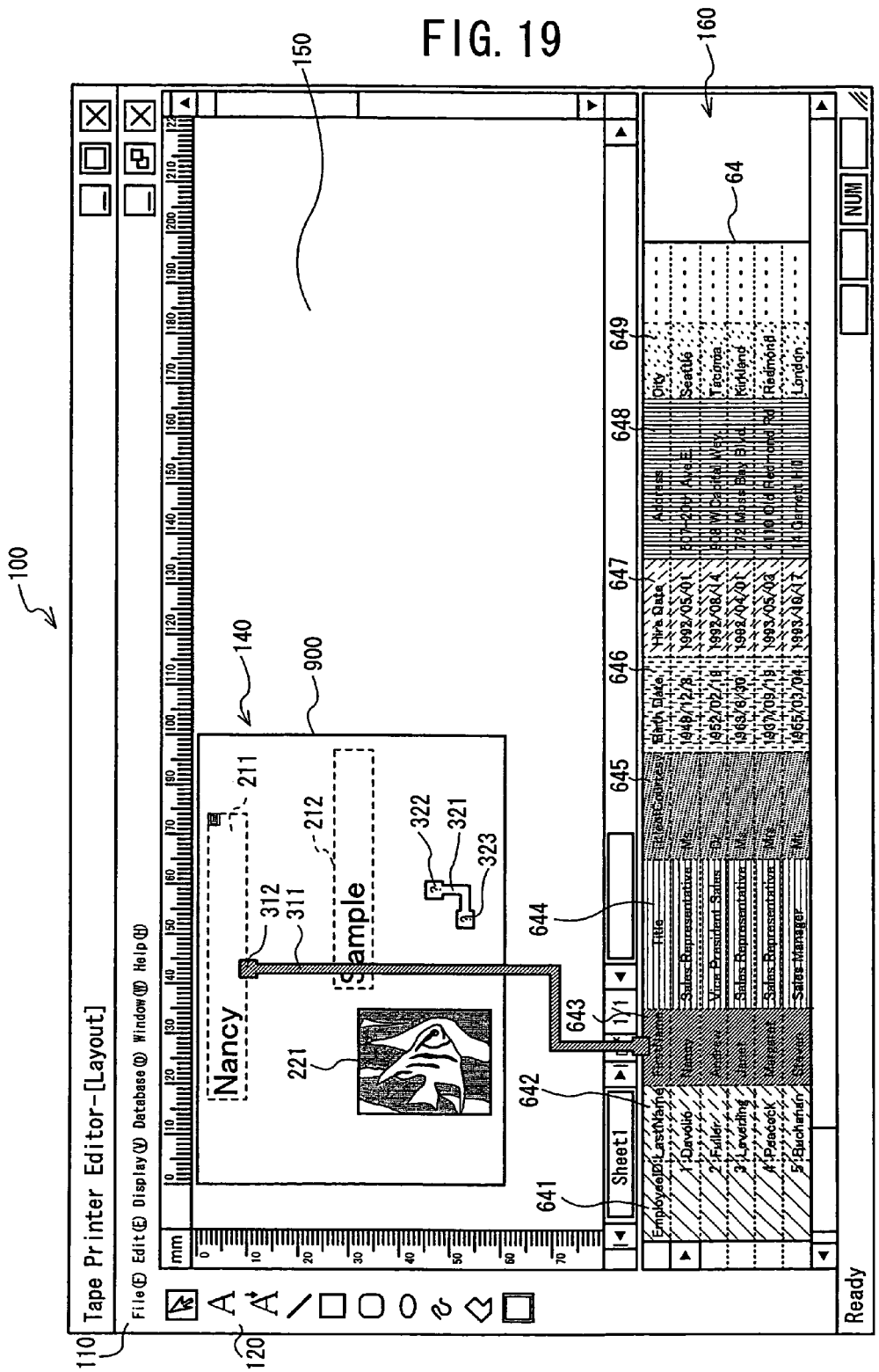
FIG. 19 is an image chart of the editor in the case where an independent link line in a non-linked condition is drawn.

If the drawing flag is set to ON (S121: YES), whether both end portions of a link line are connected is determined (S123). If any end portion of a link line is not connected (S123: NO), the not connected end portion is expressed as "not connected" (S125). For example, because, in FIG. 19, the end portion is not connected to any object or field although an independent link line 321 is drawn, the end portions 322 and 323 are expressed with "?" indicating not connected. Then, the link line itself is drawn in non-linked state with its background color as white (S127). For example, the link line 321 of FIG. 19 is expressed with white, which is different from the background color of any field.

Figure 20:
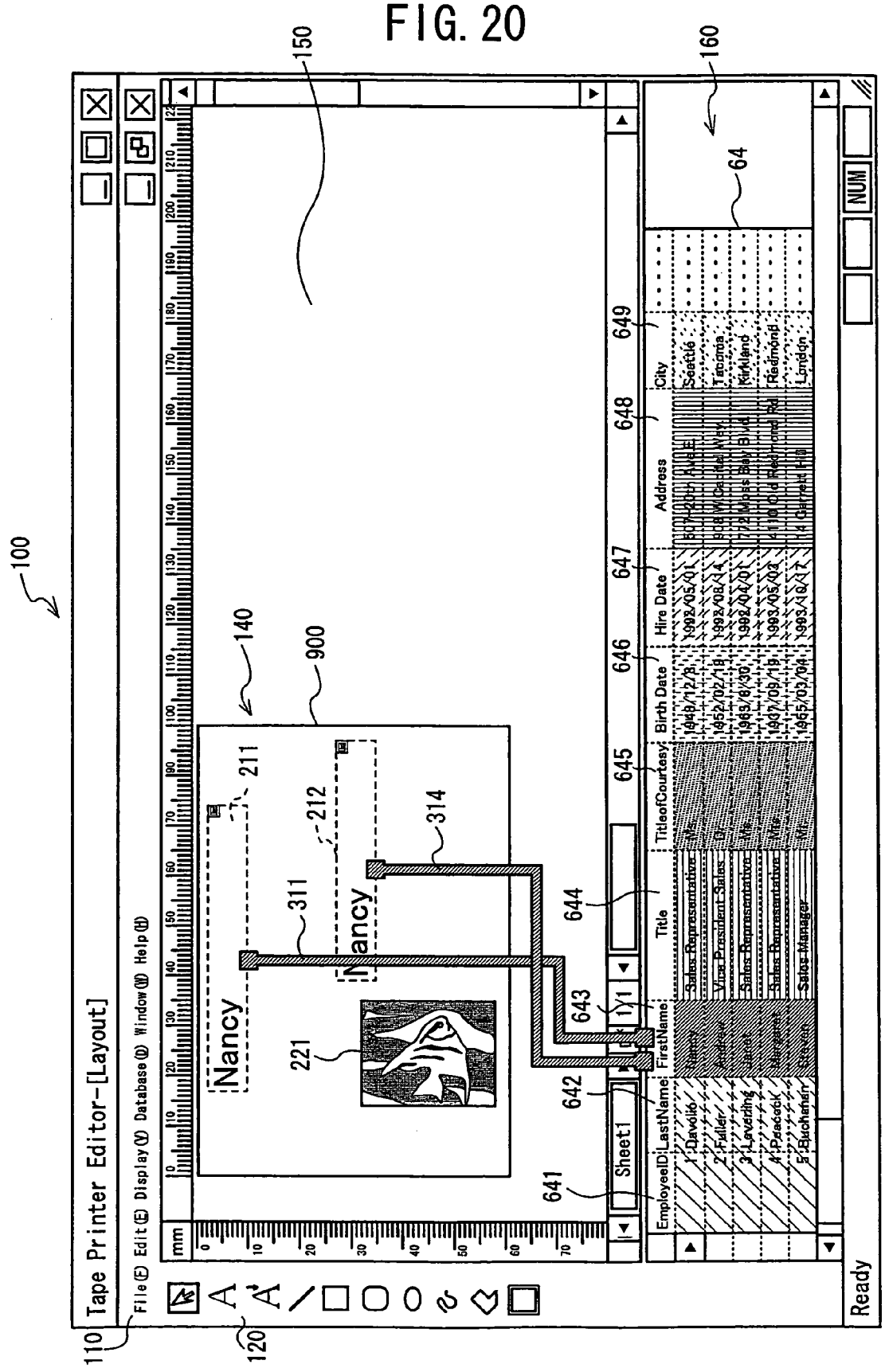
FIG. 20 is an image chart of the editor in the case where a plurality of link lines are drawn from a single field.

If both end portions of the link line are connected (S123: YES), whether another link line is connected to the same field connected to an end portion of the link line is determined (S129). Although the same field can be linked with a plurality of objects, an object can be linked with only one field, and whether such a case happens is determined. If no plurality of link lines extend from the same field (S129: NO), the procedure proceeds to S133. If a plurality of link lines extend from the same field (S129: YES), the coordinates of drawing positions are set such that they are shifted so that they do not overlap each other (S131). For example, as shown in FIG. 20, if the first name item 643 is linked with both the character object 211 and the character object 212, and, as shown, the link lines 311, 314 overlap, the link lines 311, 314 are redrawn such that they do not overlap so that they are easy to distinguish.

Next, whether an object and field located at respective end portions of the link line have the same attributes so they can be linked with each other is determined (S133). If the linking is possible (S133: YES), a currently selected link line is drawn using a set line type and the background color of the field to be linked with (S135) and the procedure returns to the main routine of FIG. 6. If the linking is impossible (S133: NO), the link line is drawn in a condition in which the linking is disabled (S137) and the procedure returns to the main routine of FIG. 6. In an example shown in FIG. 21, for example, both end portions 332, 333 of the link line 331 are provided with an indication "X" indicating that the linking is impossible because the first name item 643 is a text data item that was tried to be linked with an image object 221.

Figure 15:
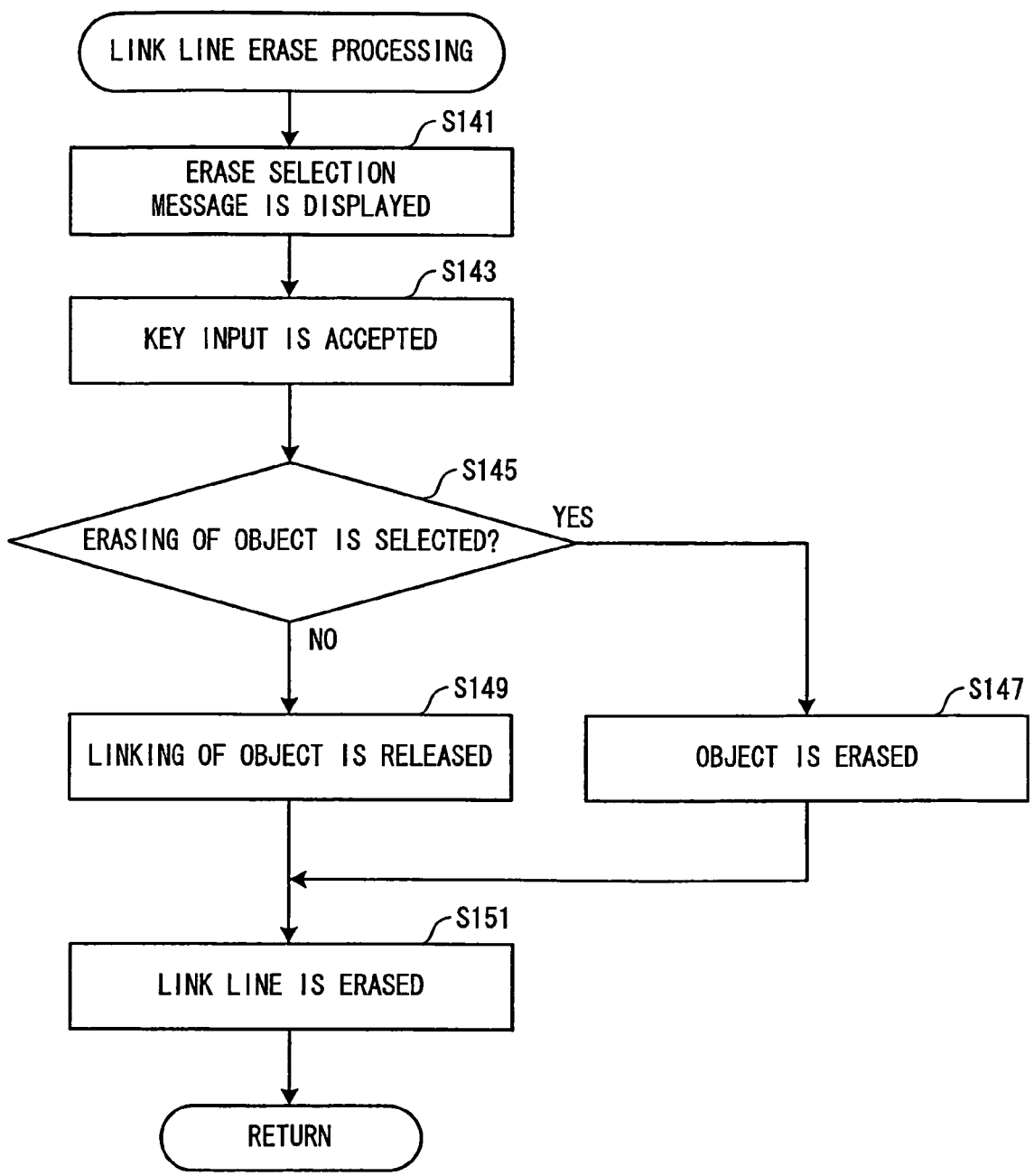
FIG. 15 is a flow chart of link line erase processing to be executed in print data editing processing.

Next, the link line erase processing executed in S40 of FIG. 6 will be described with reference to FIG. 15. An erase selection message which inquires whether a connected object is to be erased, together with erasing of the link line, is displayed (S141). The message inquires if the object and link line are to be erased together using a well known dialog box or the like, encouraging the operator to enter YES or NO. Then, an operator's key input is accepted (S143).

Whether erasing of the object is selected is determined by the key input of S143 (S145). If erasing of the object is selected (S145: YES), a linked object is erased (S147) and the link line is erased (S151). Then, the procedure returns to the main routine of FIG. 6.

Unless erasing of the object is selected (S145: NO), the link flag is set to OFF with the object itself not erased, so as to release the linkage (S149) and the link line is erased (S151). Then, the procedure returns to the main routine of FIG. 6.

According to the print data editing apparatus, the linking relationship can be grasped at a glance because the object and field are connected with each other with a link line when they are linked. Further, because the background color is set in a field and the link line connected to the field is drawn in the same color as the field, the linking relationship is expressed by making a strong impression using colors. Further, the field and object can be linked with each other by dragging the link line or by drawing an independent link line and connecting end portions thereof to an object or field. As a result, the content of the database can be edited into print data easily using an operator-friendly method.

As described above, the print data editing apparatus relates an object displayed in the work area of the display means with an item of the database displayed in the database display area with the link means and displays a link relationship between the object and database item linked with each other on the display means such that the relationship can be verified visually. Thus, the link relationship between the object and the database item can be checked accurately with only a glance at the display so as to facilitate editing of the object.

In the print data editing apparatus, if the mouse cursor is located on an object, the link display control component may display a link relationship by means of a tool tip indicating the name of an item of the database linked with the object in the vicinity of the mouse cursor. As a consequence, the link relationship between the object item and the database can be verified by paying attention to the object that is subject to editing.

In the print data editing apparatus, the link display control component may display the link relationship with a link line that connects the object and the database item linked with each other. As a consequence, the link relationship can be recognized visually at a glance.

The print data editing apparatus may further comprise a link changing means for changing the link relationship by changing the item or the object connected to an end portion of the link line. As a consequence, the database item or the object connected to the link line is changed to another database item or object, so that the linking of the database item and the object is changed thereby making it possible to change the link relationship between the database and the object by a simple operation.

In the print data editing apparatus, the link changing means may change the link relationship by dragging and dropping the link line. As a consequence, the linking of the database item and the object can be changed by a simple operation of operating the mouse or the like.

In the print data editing apparatus, the link display control component may display the link relationship, on a display, by displaying the object and the database item linked with each other in a same color. For example, if a background color is set for each item of the database and the same color, as the background color, is displayed as a frame line of the object, an effect of visual recognition is intensified by that color so that the linking of the two can be identified easily.

In the print data editing apparatus, the link display control component may cause the display of the link line in the same color as at least one of the object and the database item connected with the link line. For example, the link line may be displayed in a display color set in an object or in the same color as the display color of a database item. In addition to the display of the link line, if the color of the link line is set to the same display color as a linked object or a linked item, the effect of visual recognition can be intensified further by the color and line.

The print data editing apparatus may further comprise a link releasing means for releasing a linkage between the database item and the object linked by the link line if the link line is erased from the display. That is, if the link line is erased, the linkage of the object and database item connected with the link line is erased. As a result, the link relationship can be released intuitively without any complicated operation.

The print data editing apparatus may further comprise an object erasing means that erases the object linked with the database item by the link line from the work area if the link line is erased from the display means. That is, an object linked up to then can be erased by erasing the link line. By enabling erasing of an object in addition to releasing of the link relationship, the possibility of choice of operation widens so that editing is further facilitated.

The print data editing apparatus may further comprise a link line attribute setting component that sets attributes containing at least one of the line type and size of the link line. As a consequence, a display style meeting an operator's desire can be selected and if there exist a plurality of link relationships on a screen, a display method making it easy to determine the various relationships can be selected.

In the print data editing apparatus, if pluralities of the objects and the database items are linked, the link display control component may display the link lines such that both of them are capable of being recognized. As a consequence, if a plurality of the link relationships exist on a screen, they can be displayed in a manner which enables the operator to see clearly by sliding or overlapping the link lines.

The print data editing apparatus may further comprise a link line drawing element for drawing a link line for connecting the database item and the object not linked with each other and the link component may link the item and the object connected with a link line drawn by the link line drawing element. As a consequence, the link line can be drawn so as to connect the object and database item not yet linked with each other and a link relationship between the object and database item can be set by drawing the link line. Therefore, the operator can set up a link relationship intuitively with a graphical means, namely, drawing the link line.

In the print data editing apparatus, the link line drawing component may draw the link line by dragging and dropping the database item on the object. As a consequence, the database and object can be linked with each other by a simple operation, for example, operating the mouse.

The print data editing apparatus may further comprise a link possibility determining component that determines whether the database item and the object are capable of being linked with each other. If it is determined that the linking is impossible, by the link possibility determining component, the link display control component may display a link impossibility indication indicating that linking is impossible. As a consequence, the impossibility of linking is determined for a reason that the attribute of the object and the attribute of the database are different or the like and the determination result is displayed. Thus, whether the linking is possible can be grasped at a glance thereby making it possible to edit print data accurately.

In the print data editing apparatus, the link line drawing element may draw the link line in a condition in which the database item and the object are not linked with each other and have a link line connecting element for connecting an end portion of the link line to an appropriate one of the database item and the object. As a consequence, the link line can be drawn preliminarily in a condition in which a link relationship between the object and database item is not set and the link relationship can be set by connecting the independent link line with an object or a database item. Therefore, it is possible to select a time for drawing the link line depending on an operator's desire.

In the print data editing apparatus, the link display control component may have a display setting element for setting whether the link relationship is to be displayed. As a consequence, whether the link relationship is displayed with the link line can be set. Alternatively, a display color can be set so that it is possible to select displaying of the link relationship if it is desired to check the link relationship securely or not displaying of the link relationship if it is desired to only check the print image.

The print data editing program stored in a computer-readable medium links an object with a database item displayed in the database display area and displays a link relationship between the linked object and database item on the display such that it can be confirmed visually. Thus, the link relationship between the object and the database item can be checked positively by glancing at the display, thereby making it easy to edit the object.

In the print data editing program, if a mouse cursor is located on the object, in the link display control step, a link relationship may be displayed with a tool tip, indicating the name of an item of the database linked with the object, in the vicinity of the mouse cursor. As a consequence, a link relationship between the object and database item can be confirmed while paying attention to an object that is to be edited.

In the print data editing program, in the link display control step, the link relationship may be displayed with a link line that connects the object and the database item linked with each other. As a consequence, the link relationship can be confirmed visually at a glance.

The print data editing program may make the computer execute a link changing step of changing the link relationship by changing the database item or the object connected to an end portion of the link line. As a consequence, the database item or object connected to the link line is changed to other database item or object so that the linking of the database item and object is changed, thereby making it possible to change the link relationship between the database and the object by a simple operation.

In the print data editing program, in the link changing step, the link relationship may be changed by dragging and dropping the link line. As a consequence, the linking of the database and the object can be changed by a simple operation, for example, operating the mouse.

In the print data editing program, in the link display control step, the link relationship may be displayed by displaying the object and the database item linked with each other in a same color. For example, if a background color is set for each database item and the frame line of an object is displayed using the same color as the background color, an effect of visual recognition is intensified so that the linkage can be grasped easily.

In the print data editing program, in the link display control step, the link line may be displayed in the same color as at least one of the object and the item connected with the link line. For example, the link line is displayed in a display color set on an object or the same color as the display color of a database item If the color of the link line is set to the same color as a linked object or a linked database item in addition to the display of the link line, the effect of visual recognition can be intensified further with the color and line.

The print data editing program further may make the computer execute a link releasing step that releases the linkage between the database item and the object linked by the link line if the link line is erased from the display. That is, if the link line is erased, the linkage between the object and database item connected with the link line is deleted. As a consequence, the link relationship can be released intuitively without any complicated operation.

The print data editing program further may make the computer execute an object erasing step that erases the object linked with the database item by the link line from the work area if the link line is erased from the display. That is, by erasing the link line, a linked object is also erased. As a consequence, by enabling erasing of an object in addition to releasing the link relationship, the possibility of choice on the operation widens so that editing is further facilitated.

The print data editing program further may make the computer execute a link line attribute setting step of setting attributes containing at least one of the line type and size of the link line. As a consequence, a display style meeting an operator's desire can be selected and if there exists a plurality of link relationships on a screen, a display method making it easy to determine the linkages can be selected.

In the print data editing program, in the link display control step, if pluralities of the objects and the database items are linked, the link lines may be displayed such that all of them are capable of being recognized in the link display control step. As a consequence, if a plurality of the link relationships exist on the display screen, they can be displayed in a manner which enables the operator to see clearly by sliding or overlapping the link lines.

The print data editing program further may make the computer execute a link line drawing step of drawing a link line for connecting the database item and the object not linked with each other and, in the link step, the database item and the object connected with a link line drawn in the link line drawing step may be linked with each other. As a consequence, the link line can be drawn so as to connect the object and the database item not yet linked with each other and a link relationship between the object and database item can be set by drawing the link line. Therefore, the operator can set up a link relationship intuitively with a graphical means, namely, drawing the link line.

In the print data editing program, in the link line drawing step, the link line may be drawn by dragging and dropping the item on the object. As a consequence, the database and object can be linked with each other by a simple operation, for example, operating the mouse.

The print data editing program further may make the computer execute a link possibility determining step of determining whether the database item and the object are capable of being linked with each other and, if it is determined that the linking is impossible in the link possibility determining step, a link impossibility indication indicating that linking is impossible may be displayed in the link display control step. As a consequence, the impossibility of linking is determined for a reason that the attribute of the object and the attribute of the database item are different and the determination result is displayed. Thus, whether the linking is possible can be grasped at a glance thereby making it possible to edit print data accurately.

According to the print data editing program, in the link line drawing step, the link line may be drawn in a condition in which the database item and the object are not linked with each other and the computer may be made to execute a link line connecting step of connecting an end portion of the link line to the appropriate one of the database item and the object. As a consequence, the link line can be drawn preliminarily in a condition in which a link relationship between the object and the database item is not set and the link relationship can be set by connecting the independent link line with an object or a database item. Therefore, it is possible to select a timing for drawing the link line depending on an operator's desire.

According to the print data editing program, in the link display control step, the computer may be made to execute a display setting step of setting whether the link relationship is to be displayed. As a consequence, whether the link relationship is displayed with the link line or a display color can be set, so that it is possible to select displaying of the link relationship if it is desired to positively check the link relationship or not displaying of the link relationship if it is desired to only view the print image.

Although the disclosure has been made with reference to exemplary embodiments, it is to be understood that the invention is not limited to the exemplary embodiments or structures. Although the various elements of the exemplary embodiments are shown in various combinations and configurations, other combinations and configurations, including more, less or only a single element, are also within the spirit and scope of the invention.

What is claimed is:

1. A print data editing apparatus for creating and editing print data to be printed on a print unit, comprising:
    a display that displays inputted data composed of characters, graphics, images, tables or drawing data as an object that is a print object to be printed on the print unit;
    a work area provided in the display for editing the object;
    a database storage device that stores a database as an assembly of a plurality of the inputted data having information of each item;
    a database display area provided in the display that displays at least items of the database;
    a linking element that links an item of the database displayed in the database display area with the object displayed in the work area; and
    a link display controller that controls displaying a link relationship between the database item and the object linked by the linking element on the display so that the linkage is capable of being recognized, the link display controller controlling display of the link relationship with a link line that connects the object and the database item linked with each other; and
    a link changing element that changes the link relationship by changing the database item or the object connected to an appropriate end portion of the link line,
    wherein the link changing element changes the link relationship by dragging and dropping the appropriate end of the link line, and
    wherein upon changing the link relationship by dragging and dropping, a content of the object is updated with a content of the database item to reflect the changed link relationship with the database item.

2. The print data editing apparatus according to claim 1, further comprising an element for moving a cursor on the display, wherein if the cursor is located on the object, the link display controller causes a display of the link relationship by means of a tool tip indicating the name of the item of the database linked with the object in the vicinity of the cursor.

3. The print data editing apparatus according to claim 1, wherein the link display controller controls display of the link relationship by displaying the object and the database item linked with each other in a same color.

4. The print data editing apparatus according to claim 1, wherein the link display controller controls display of the link line in the same color as at least one of the object and the database item connected with the link line.

5. The print data editing apparatus according to claim 1, further comprising a link releasing element that releases a link between the database item and the object linked by the link line if the link line is erased from the display.

6. The print data editing apparatus according to claim 1, further comprising an object erasing element that erases the object linked with the database item by the link line from the work area if the link line is erased from the display.

7. The print data editing apparatus according to claim 1, further comprising a link line attribute setting element that sets attributes containing at least one of the line type and size of the link line.

8. The print data editing apparatus according to claim 1, wherein, if pluralities of the objects and the database items are linked, the link display controller controls display of a plurality of the link lines such that all of the plurality of link lines are capable of being recognized.

9. The print data editing apparatus according to claim 1, further comprising a link line drawing element that draws the link line for connecting the database item and the object not linked with each other, wherein the linking element links the database item and the object connected with the link line drawn by the link line drawing element.

10. The print data editing apparatus according to claim 9, wherein the link line drawing element draws the link line by dragging and dropping the database item on the object.

11. The print data editing apparatus according to claim 1, further comprising a link possibility determining element that determines whether the database item and the object are capable of being linked with each other, wherein, if it is determined that the linking is impossible by the link possibility determining element, the link display controller controls display of a link impossibility indication indicating that linking is impossible.

12. The print data editing apparatus according to claim 9, wherein the link line drawing element draws the link line in a condition in which the item and the object are not linked with each other and has a link line connecting element that is capable of connecting an appropriate end portion of the link line respectively to the database item and the object.

13. The print data editing apparatus according to claim 1, wherein the link display controller has a display setting element that sets whether the link relationship is to be displayed.

14. A print data editing program stored in a computer-readable medium, for making a computer execute creation and editing of print data to be printed on a print unit, comprising:
    an object display step of displaying inputted data, composed of characters, graphics, images, tables or drawing data as an object on a work area provided on a display, that is a print object to be printed by the print unit;
    a database display step of displaying an item of a database that is an assembly of a plurality of the inputted data having information of each of at least one item, stored in a database storage device, in at least a database display area provided on the display;
    a link step of linking a database item to be displayed in the database display area with the object to be displayed in the work area; and
    a link display control step controlling display of a link relationship between the database item and the object linked in the link step on the display so that the link relationship is capable of being recognized, in the link display control step, the link relationship being displayed with a link line that connects the object and the database item linked with each other; and
    a link changing step of changing the link relationship by changing the database item or the object connected to an appropriate end portion of the link line,
    wherein, in the link changing step, the link relationship is changed by dragging and dropping an appropriate end portion of the link line, and wherein upon changing the link relationship by dragging and dropping, a content of the object is updated with a content of the database item to reflect the changed link relationship with the database item.

15. The print data editing program stored in a computer-readable medium according to claim 14, wherein, if a cursor is located on the displayed object in the link display control step, a link relationship is displayed during a name identification step with a tool tip indicating the name of an item of the database linked with the object in the vicinity of the cursor.

16. The print data editing program stored in a computer-readable medium according to claim 14, wherein, in the link display control step, the link relationship is displayed by displaying the object and the database item linked with each other in a same color.

17. The print data editing program stored in a computer-readable medium according to claim 14, wherein, in the link display control step, the link line is displayed in the same color as at least one of the object and the database item connected with the link line.

18. The print data editing program stored in a computer-readable medium according to claim 14, further making the computer execute a link releasing step that releases a linkage between the database item and the object linked by the link line if the link line is erased from the display.

19. The print data editing program stored in a computer-readable medium according to claim 14, further making the computer execute an object erasing step that erases the object linked with the database item by the link line from the work area if the link line is erased from the display.

20. The print data editing program stored in a computer-readable medium according to claim 14, further making the computer execute a link line attribute setting step of setting attributes containing at least one of the line type and size of the link line.

21. The print data editing program stored in a computer-readable medium according to claim 14, wherein, in the link display control step, if pluralities of the objects and the database items are linked, a corresponding plurality of link lines are displayed such that all of the plurality of link lines are capable of being recognized.

22. The print data editing program stored in a computer-readable medium according to claim 14, further making the computer execute a link line drawing step of drawing the link line for connecting the database item and the object not linked with each other, wherein the link step links the database item and the object connected with the link line drawn in the link line drawing step.

23. The print data editing program stored in a computer-readable medium according to claim 22, wherein, in the link line drawing step, the link line is drawn by dragging and dropping the database item on the object.

24. The print data editing program stored in a computer-readable medium according to claim 14, further making the computer execute a link possibility determining step of determining whether the database item and the object are capable of being linked with each other, wherein, if it is determined that the linking is impossible in the link possibility determining step, a link impossibility indication indicating that linking is impossible is displayed in the link display control step.

25. The print data editing program stored in a computer-readable medium according to claim 22, wherein, in the link line drawing step, the link line is drawn in a condition in which the database item and the object are not linked with each other and the computer is made to execute a link line connecting step of connecting an appropriate end portion of the link line to the database item and the object.

26. The print data editing program stored in a computer-readable medium according to claim 14, wherein, in the link display control step, the computer is made to execute a display setting step of setting whether the link relationship is to be displayed.

27. The print data editing apparatus according to claim 1, wherein the link relationship links plural objects and a single database.

28. The print data editing apparatus according to claim 6, wherein an erase selection message which inquires whether a connected object is to be erased, together with erasing of the link line is displayed.

29. The print data editing apparatus according to claim 9, wherein the link relationship links plural objects and a single database.

30. The print data editing program stored in a computer-readable medium according to claim 14, wherein the link relationship links plural objects and a single database.

31. The print data editing program stored in a computer-readable medium according to claim 19, wherein an erase selection message which inquires whether a connected object is to be erased, together with erasing of the link line is displayed.

32. The print data editing program stored in a computer-readable medium according to claim 22, wherein the link relationship links plural objects and a single database.

* * * * *